(12) United States Patent
Song et al.

(10) Patent No.: US 12,055,976 B2
(45) Date of Patent: Aug. 6, 2024

(54) ELECTRONIC DEVICE INCLUDING FOLDABLE DISPLAY

(71) Applicant: Samsung Electronics Co., Ltd., Suwon-si (KR)

(72) Inventors: Kwonho Song, Suwon-si (KR); Jungchul An, Suwon-si (KR); Jaehwan Park, Suwon-si (KR); Shinhyuk Yoon, Suwon-si (KR); Jonghwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 17/901,223

(22) Filed: Sep. 1, 2022

(65) Prior Publication Data

US 2023/0062448 A1 Mar. 2, 2023

Related U.S. Application Data

(63) Continuation of application No. PCT/KR2022/013048, filed on Aug. 31, 2022.

(30) Foreign Application Priority Data

Sep. 1, 2021 (KR) ........................ 10-2021-0116335

(51) Int. Cl.
*G06F 1/16* (2006.01)
*G09F 9/30* (2006.01)
(52) U.S. Cl.
CPC .......... *G06F 1/1652* (2013.01); *G06F 1/1641* (2013.01); *G06F 1/1681* (2013.01); *G09F 9/301* (2013.01)
(58) Field of Classification Search
None
See application file for complete search history.

(56) References Cited

U.S. PATENT DOCUMENTS 9,460,643 B2 * 10/2016 Hirakata ............... G06F 1/1616
9,710,033 B2 * 7/2017 Yamazaki ............. G06F 1/1652
(Continued)

FOREIGN PATENT DOCUMENTS

| CN | 213937488 U | 8/2021 |
| JP | 2013-062332 A | 4/2013 |

(Continued)

OTHER PUBLICATIONS

International Search Report dated Nov. 25, 2022, issued in International Patent Application No. PCT/KR2022/013048.

*Primary Examiner* — Xanthia C Relford
(74) *Attorney, Agent, or Firm* — Jefferson IP Law, LLP

(57) ABSTRACT

An electronic device is provided. The electronic device includes a housing including a first plate, a second plate, and a third plate connecting the first plate and the second plate to be pivotable from a folded state of the first plate and the second plate to an unfolded state, a flexible display extending from the first plate across the third plate to the second plate, and at least one waterproofing member disposed on two lengthwise opposite ends of the third plate. The first plate may include at least one first recessed portion recessed inward from at least a portion of an edge of the first plate. The second plate may include at least one second recessed portion recessed inward from at least a portion of an edge of the second plate. At least a portion of the third plate may include a portion formed in a lattice pattern. The third plate may be formed to be shorter in length than the first plate and the second plate. The at least one first recessed portion and the at least one second recessed portion may be disposed in two lengthwise opposite ends of the third plate.

20 Claims, 17 Drawing Sheets

(56) References Cited

U.S. PATENT DOCUMENTS

| | | | |
|---|---|---|---|
| 9,719,665 B2* | 8/2017 | Hirakata | H04W 72/569 |
| 9,909,725 B2* | 3/2018 | Aoyama | F21L 4/00 |
| 10,711,980 B2* | 7/2020 | Hirakata | F21V 15/012 |
| 2012/0154707 A1 | 6/2012 | Hsieh et al. | |
| 2013/0169515 A1 | 7/2013 | Prushinskiy et al. | |
| 2017/0179423 A1 | 6/2017 | Kwon et al. | |
| 2017/0344053 A1 | 11/2017 | Kim et al. | |
| 2020/0053897 A1 | 2/2020 | Woo et al. | |
| 2020/0162596 A1 | 5/2020 | Kim et al. | |
| 2023/0195180 A1 | 6/2023 | Park et al. | |

FOREIGN PATENT DOCUMENTS

| | | |
|---|---|---|
| KR | 10-1501034 B1 | 3/2015 |
| KR | 10-2018-0062271 A | 6/2018 |
| KR | 10-2019-0046578 A | 5/2019 |
| KR | 10-2019-0064552 A | 6/2019 |
| KR | 10-2019-0104105 A | 9/2019 |
| KR | 10-2020-0019056 A | 2/2020 |
| KR | 10-2020-0057236 A | 5/2020 |
| KR | 10-2020-0137948 A | 12/2020 |
| KR | 10-2021-0024435 A | 3/2021 |

* cited by examiner

ELECTRONIC DEVICE INCLUDING FOLDABLE DISPLAY

CROSS-REFERENCE TO RELATED APPLICATION(S)

This application is a continuation application, claiming priority under § 365(c), of an International application No. PCT/KR2022/013048, filed on Aug. 31, 2022, which is based on and claims the benefit of a Korean patent application number 10-2021-0116335, filed on Sep. 1, 2021, in the Korean Intellectual Property Office, the disclosure of which is incorporated by reference herein in its entirety.

TECHNICAL FIELD

The disclosure relates to an electronic device including a foldable display.

BACKGROUND ART

Advancing information communication and semiconductor technologies accelerate the spread and use of various electronic devices. In particular, recent electronic devices are being developed to carry out communication while carried on.

The term "electronic device" may mean a device performing a particular function according to its equipped program, such as a home appliance, an electronic scheduler, a portable multimedia player, a mobile communication terminal, a tablet personal computer (PC), a video/sound device, a desktop PC or laptop computer, a navigation for automobile, or the like. For example, electronic devices may output stored information as voices or images. As electronic devices are highly integrated, and high-speed, high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling or e-wallet function. Such electronic devices become compact enough for users to carry in a convenient way.

As mobile communication services extend up to multimedia service sectors, the display of the electronic device may be increased to allow the user satisfactory use of multimedia services as well as voice call or text messaging services. Accordingly, a foldable flexible display may be disposed on the entire area of the housing structure separated to be foldable.

Further, in recent years, for the convenience of users for use in various environments, high-performance waterproofing and dustproofing are required.

The above information is presented as background information only to assist with an understanding of the disclosure. No determination has been made, and no assertion is made, as to whether any of the above might be applicable as prior art with regard to the disclosure.

DISCLOSURE

Technical Problem

As a foldable flexible display is disposed on the entire area of a housing structure, the housing has a non-fixed structure. It is essential that the non-fixed structure includes a plurality of components. As a plurality of components are used in the foldable part, a gapped space between the components may be created, and foreign objects may enter the gapped space. Accordingly, it is necessary to protect the internal structure so that a foreign object enters the electronic device. For example, a high performance for waterproofing and/or dustproofing is required.

Aspects of the disclosure are to address at least the above-mentioned problems and/or disadvantages and to provide at least the advantages described below. Accordingly, an aspect of the disclosure is to provide a waterproofing and/or dustproofing function of an electronic device by placing a waterproofing member in the gapped space.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a first plate, a second plate, and a third plate connecting the first plate and the second plate to be pivotable from a folded state of the first plate and the second plate to an unfolded state, a flexible display extending from the first plate across the third plate to the second plate, and at least one waterproofing member disposed on two lengthwise opposite ends of the third plate. The first plate may include at least one first recessed portion recessed inward from at least a portion of an edge of the first plate. The second plate may include at least one second recessed portion recessed inward from at least a portion of an edge of the second plate. At least a portion of the third plate may include a portion formed in a lattice pattern. The third plate may be formed to be shorter in length than the first plate and the second plate. The at least one first recessed portion and the at least one second recessed portion may be disposed in two lengthwise opposite ends of the third plate.

In accordance with another aspect of the disclosure, an electronic device is provided. The electronic device includes a housing including a first plate and a second plate providing a motion relative to the first plate and disposed to be spaced apart from the first plate, a flexible display extending from the first plate to the second plate, and at least one waterproofing member disposed between the first plate and the second plate. The first plate may include at least one first recessed portion recessed inward from at least a portion of an edge of the first plate. The second plate may include at least one second recessed portion recessed inward from at least a portion of an edge of the second plate. The at least one first recessed portion may be formed in two opposite ends of one surface of the first plate facing the second plate. The at least one second recessed portion may be formed in two opposite ends of one surface of the second plate facing the first plate.

Advantageous Effects

According to various embodiments of the disclosure, it is possible to prevent entry of a foreign object from the outside by placing a waterproofing member in at least one area of the electronic device. It is thus possible to enhance the durability and usability of the electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
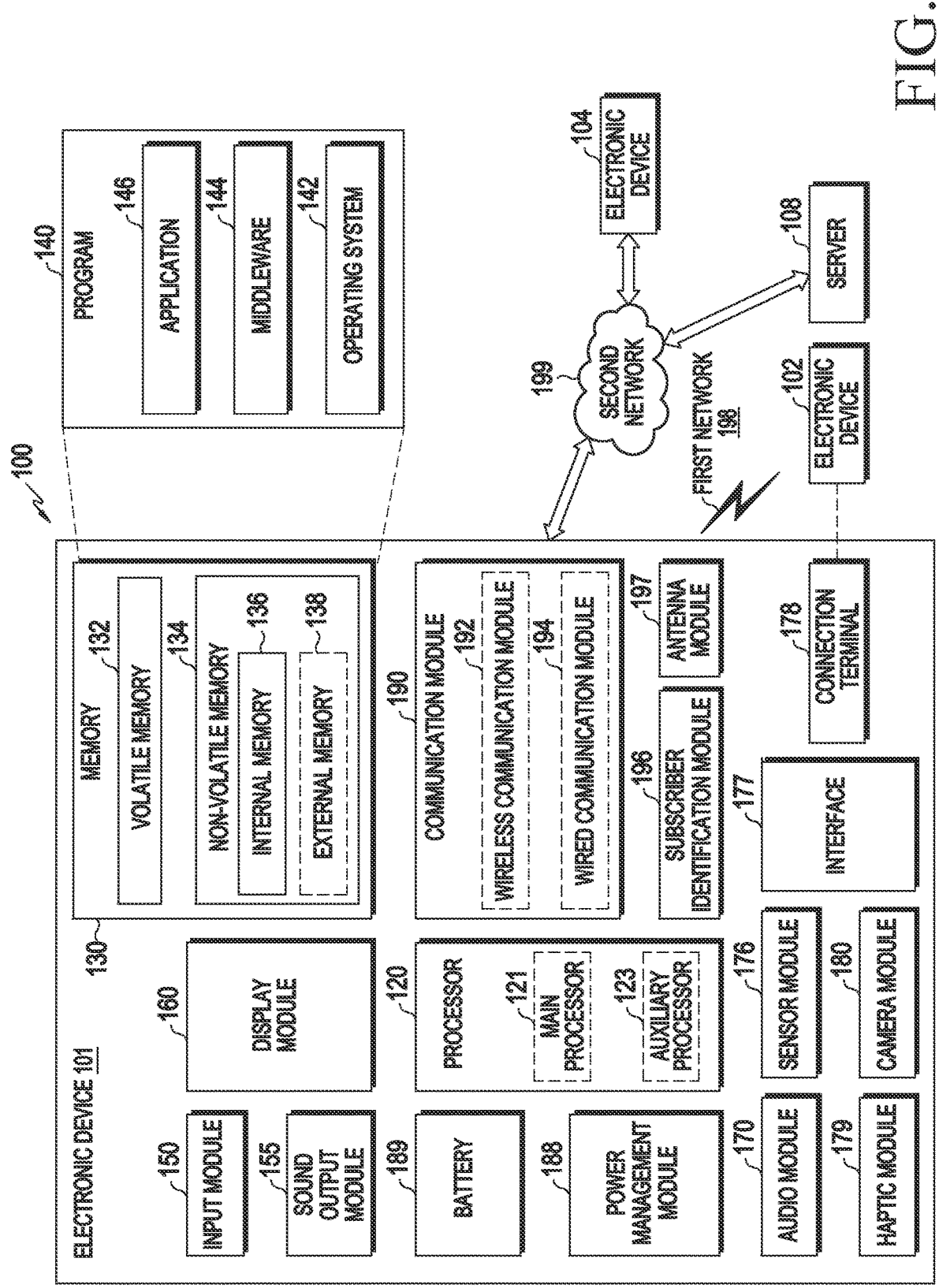
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one (e.g., the connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a $5^{th}$ generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment of the disclosure, the antenna module may include an antenna including a radiator formed of a conductor or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
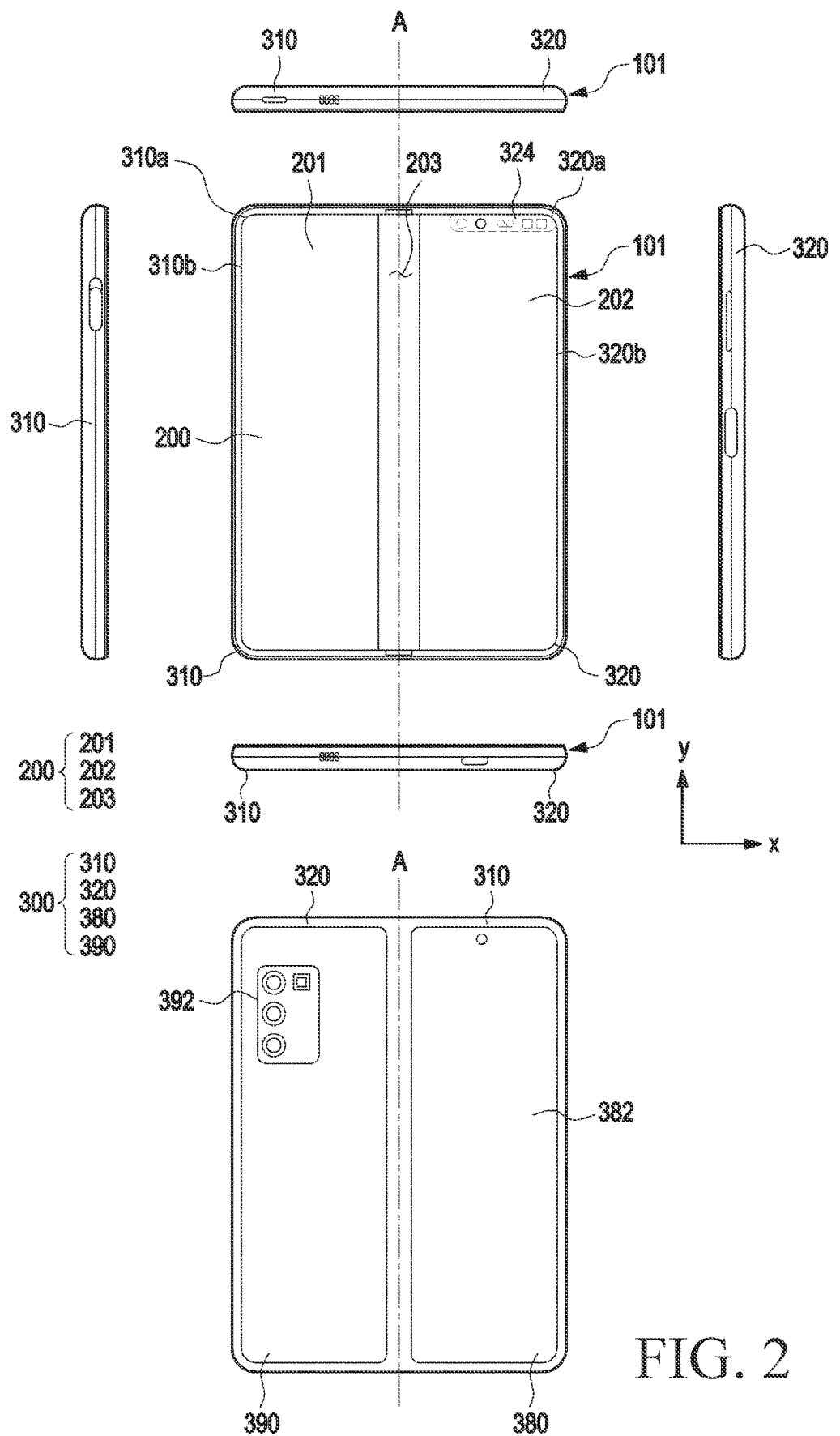
FIG. 2 is a view illustrating an unfolded state of a foldable electronic device according to an embodiment of the disclosure.

FIG. 2 is a view illustrating an unfolded state among folding states of a foldable electronic device according to an embodiment of the disclosure.

Figure 3:
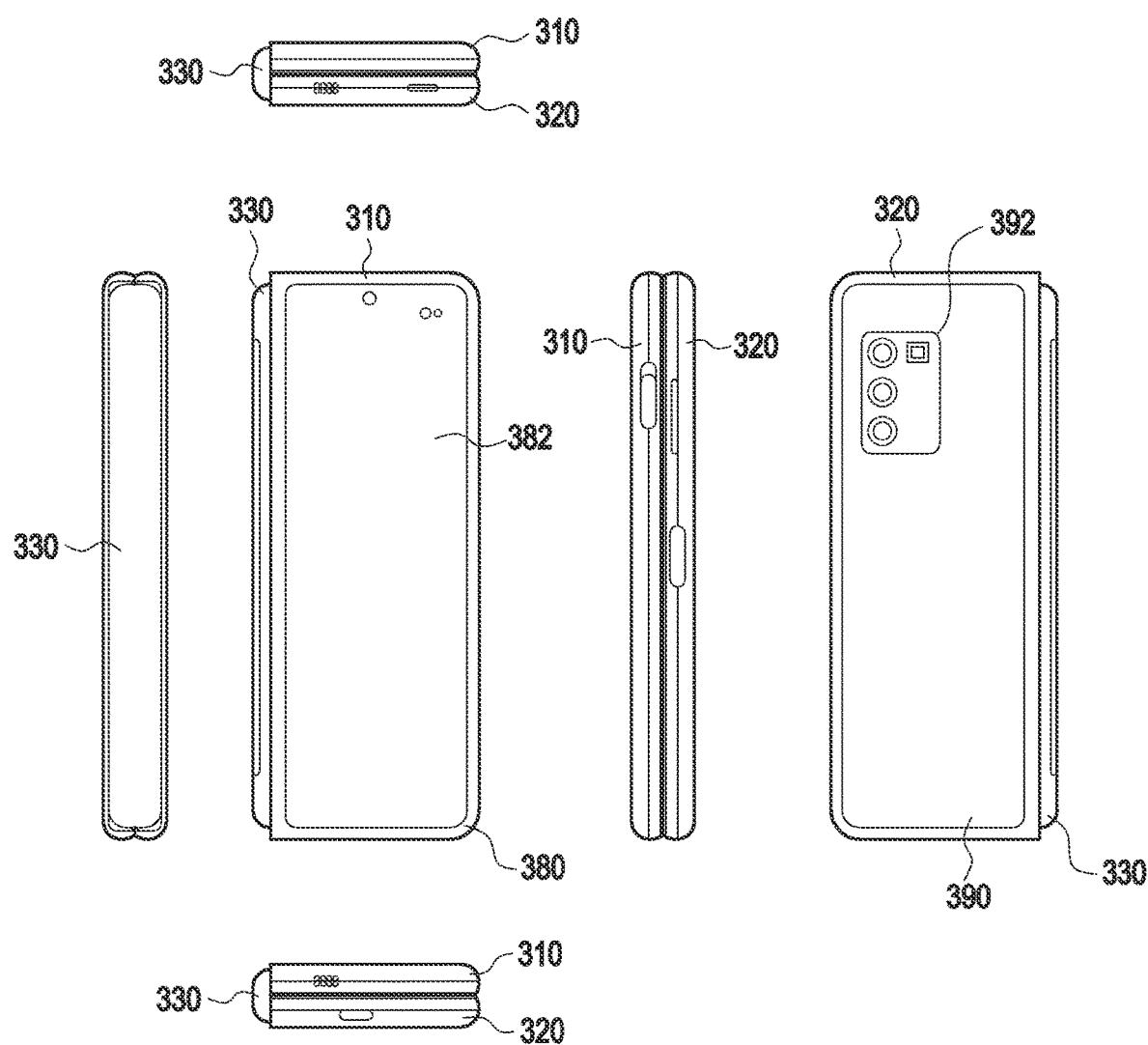
FIG. 3 is a view illustrating a folded state of a foldable electronic device according to an embodiment of the disclosure.

FIG. 3 is a view illustrating a folded state among folding states of a foldable electronic device according to an embodiment of the disclosure.

Referring to FIGS. 2 and 3, according to an embodiment of the disclosure, a foldable electronic device (hereinafter, an electronic device 101) may include a foldable housing 300, a hinge case (e.g., the hinge case 330 of FIG. 3) (e.g., a hinge cover) covering a foldable portion of the foldable housing 300, and a flexible or foldable display 200 (hereinafter, simply "display 200") (e.g., the display module 160 of FIG. 1) disposed in a space formed by the foldable housing 300. According to an embodiment of the disclosure, the surface on which the display 200 is disposed is defined as a front surface of the electronic device 101. The opposite surface of the front surface is defined as a rear surface of the electronic device 101. Further, the surface surrounding the space between the front and rear surfaces is defined as a side surface of the electronic device 101.

Figure 4:
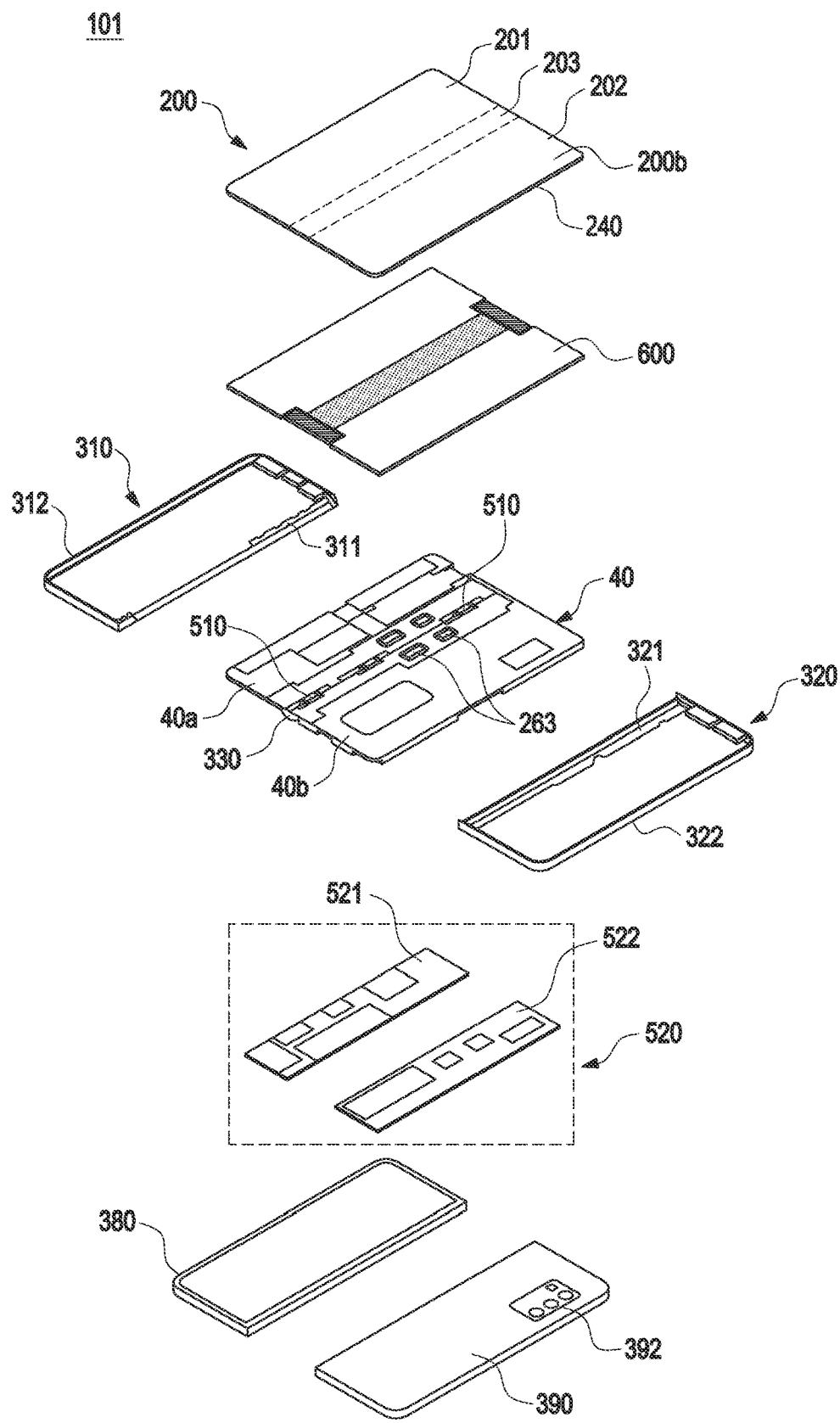
FIG. 4 is an exploded perspective view illustrating a foldable electronic device according to an embodiment of the disclosure.

According to various embodiments of the disclosure, the foldable housing 300 may include a first housing structure 310, a second housing structure 320 including a sensor area 324, a first rear cover 380, a second rear cover 390, and a hinge structure (e.g., a hinge structure 510 of FIG. 4). The foldable housing 300 of the electronic device 101 are not limited to the shape and coupling shown in FIGS. 2 and 3 but may rather be implemented in other shapes or via a combination and/or coupling of other components. For example, the first housing structure 310 and the first rear cover 380 may be integrally formed with each other, and the second housing structure 320 and the second rear cover 390 may be integrally formed with each other.

According to various embodiments of the disclosure, the first housing structure 310 may be connected to the hinge structure (e.g., the hinge structure 510 of FIG. 4) and may include a first surface facing in a first direction and a second surface facing in a second direction opposite to the first direction. The second housing structure 320 may be connected to the hinge structure 510 and may include a third surface facing in a third direction and a fourth surface facing in a fourth direction opposite to the third direction, and may rotate from the first housing structure 310 on the hinge structure 510. Thus, the electronic device 101 may turn into a folded state or unfolded state. In the folded state of the electronic device 101, the first surface may face the third surface and, in the unfolded state, the third direction may be parallel to the first direction.

According to various embodiments of the disclosure, the first housing structure 310 and the second housing structure 320 may be disposed on both sides of the folding axis A, and may have an overall symmetrical shape with respect to the folding axis A. As is described below, the angle or distance between the first housing structure 310 and the second housing structure 320 may be varied depending on whether the electronic device 101 is in the unfolded state, the folded state, or the partially unfolded intermediate state. According to an embodiment of the disclosure, the second housing structure 320 further includes the sensor area 324 where various sensors are disposed, unlike the first housing structure 310 but, in the remaining area, the second housing structure 320 may be symmetrical in shape with the first housing structure 310.

According to various embodiments of the disclosure, as shown in FIG. 2, the first housing structure 310 and the second housing structure 320 together may form a recess to receive the display 200. In an embodiment of the disclosure, due to the sensor area 324, the recess may have two or more different widths in the direction perpendicular to the folding axis A.

According to an embodiment of the disclosure, the recess may have a first width between a first portion 310a of the first housing structure 310, which is parallel with the folding axis A, and a first portion 320a of the second housing structure 320, which is formed at an edge of the sensor area 324. The recess may have a second width formed by a second portion 310b of the first housing structure 310 and a second portion 320b of the second housing structure 320, which does not correspond to the sensor area 324 and is parallel with the folding axis A. In this case, the second width may be longer than the first width. As another example, the first portion 310a of the first housing structure 310 and the first portion 320a of the second housing structure 320, which are asymmetrical with each other, may form the first width of the recess, and the second portion 310b of the first housing structure 310 and the second portion 320b of the second housing structure 320, which are symmetrical with each other, may form the second width of the recess. In an embodiment of the disclosure, the first portion 320a and second portion 320b of the second housing structure 320 may have different distances from the folding axis A. The width of the recess is not limited thereto. According to another embodiment of the disclosure, the recess may have a plurality of widths due to the shape of the sensor area 324 or the asymmetric portions of the first housing structure 310 and the second housing structure 320.

According to various embodiments of the disclosure, at least a portion of the first housing structure 310 and the second housing structure 320 may be formed of a metal or a non-metal material having a predetermined degree of rigidity to support the display 200. At least a portion formed of metal may provide a ground plane of the electronic device 101 and may be electrically connected with a ground line formed on a printed circuit board (e.g., the circuit board 520 of FIG. 4).

According to various embodiments of the disclosure, the sensor area 324 may be formed adjacent to a corner of the second housing 320 and to have a predetermined area. However, the placement, shape, or size of the sensor area 324 is not limited to those illustrated. For example, in another embodiment of the disclosure, the sensor area 324 may be provided in a different corner of the second housing structure 320 or in any area between the top corner and the bottom corner. In an embodiment of the disclosure, components for performing various functions, embedded in the electronic device 101, may be visually exposed through the sensor area 324 or one or more openings in the sensor area 324 to the front surface of the electronic device 101. In various embodiments of the disclosure, the components may include various kinds of sensors. The sensor may include at least one of, e.g., a front-facing camera, a receiver, or a proximity sensor.

According to various embodiments of the disclosure, the first rear cover 380 may be disposed on one side of the folding axis A on the rear surface of the electronic device 101 and have, e.g., a substantially rectangular periphery which may be surrounded by the first housing structure 310. Similarly, the second rear cover 390 may be disposed on the opposite side of the folding axis on the rear surface of the electronic device 101 and its periphery may be surrounded by the second housing structure 320.

According to various embodiments of the disclosure, the first rear cover 380 and the second rear cover 390 may be substantially symmetrical in shape with respect to the folding axis (axis A). However, the first rear cover 380 and the second rear cover 390 are not necessarily symmetrical in shape. In another embodiment of the disclosure, the electronic device 101 may include the first rear cover 380 and the second rear cover 390 in various shapes. According to another embodiment of the disclosure, the first rear cover 380 may be integrally formed with the first housing structure 310, and the second rear cover 390 may be integrally formed with the second housing structure 320.

According to various embodiments of the disclosure, the first rear cover 380, the second rear cover 390, the first housing structure 310, and the second housing structure 320 may form a space where various components (e.g., a printed circuit board or battery) of the electronic device 101 may be disposed. According to an embodiment of the disclosure, one or more components may be arranged or visually exposed on/through the rear surface of the electronic device 101. For example, at least a portion of a sub display may be visually exposed through a first rear surface area 382 of the first rear cover 380. In another embodiment of the disclosure, one or more components or sensors may be visually exposed through a second rear surface area 392 of the second rear cover 390. According to various embodiments of the disclosure, the sensor may include a proximity sensor and/or a rear-facing camera.

According to various embodiments of the disclosure, a front camera visually exposed to the front surface of the electronic device 101 through one or more openings prepared in the sensor area 324 or a rear camera exposed through a second rear surface area 392 of the second rear cover 390 may include one or more lenses, an image sensor, and/or an image signal processor. The flash may include, e.g., a light emitting diode (LED) or a xenon lamp. In some embodiments of the disclosure, two or more lenses (an infrared (IR) camera, a wide-angle lens, and a telescopic lens) and image sensors may be disposed on one surface of the electronic device 101.

Referring to FIG. 3, the hinge case 330 may be disposed between the first housing structure 310 and the second housing structure 320 to hide the internal components (e.g., the hinge structure 510 of FIG. 4). According to an embodiment of the disclosure, the hinge case 330 may be hidden by a portion of the first housing structure 310 and second housing structure 320 or be exposed to the outside depending on the folding state (e.g., the unfolded state, intermediate state, or folded state) of the electronic device 101.

According to an embodiment of the disclosure, as shown in FIG. 2, in the unfolded state of the electronic device 101, the hinge case 330 may be hidden, and thus not exposed, by the first housing structure 310 and the second housing structure 320. As another example, as shown in FIG. 3, in the folded state (e.g., a fully folded state) of the electronic device 101, the hinge case 330 may be exposed to the outside between the first housing structure 310 and the second housing structure 320. As another example, in an intermediate state in which the first housing structure 310 and the second housing structure 320 are folded with a certain angle, the hinge case 330 may be partially exposed to the outside between the first housing structure 310 and the second housing structure 320. In this case, however, the exposed area may be smaller than in the fully folded state. According to an embodiment of the disclosure, the hinge case 330 may include a curved surface.

According to various embodiments of the disclosure, the display 200 may be disposed in a space formed by the foldable housing 300. For example, the display 200 may be seated on a recess formed by the foldable housing 300 and may occupy most of the front surface of the electronic device 101. Thus, the front surface of the electronic device 101 may include the display 200 and a partial area of the first housing structure 310 and a partial area of the second housing structure 320, which are adjacent to the display 200. The rear surface of the electronic device 101 may include the first rear cover 380, a partial area of the first housing structure 310, which is adjacent to the first rear cover 380, the second rear cover 390, and a partial area of the second housing structure 320, which is adjacent to the second rear cover 390.

According to various embodiments of the disclosure, the display 200 may mean a display at least a portion of which may be transformed into a flat or curved surface. According to an embodiment of the disclosure, the display 200 may include a folding area 203, a first area 201 disposed on one side of the folding area 203 (e.g., the left side of the folding area 203 of FIG. 2), and a second area 202 disposed on the opposite side of the folding area 203 (e.g., the right side of the folding area 203 of FIG. 2).

However, the segmentation of the display 200 as shown in FIG. 2 is merely an example, and the display 200 may be divided into a plurality of (e.g., four or more, or two) areas depending on the structure or function of the display 200. For example, in the embodiment illustrated in FIG. 2, the display 200 may be divided into the areas by the folding area 203 or folding axis (axis A) extending in parallel with the y axis but, in another embodiment of the disclosure, the display 200 may be divided into the areas with respect to another folding area (e.g., a folding area parallel with the x axis) or another folding axis (e.g., a folding axis parallel with the x axis). According to an embodiment of the disclosure, the display 200 may be coupled with or disposed adjacent to a touch detection circuit, a pressure sensor capable of measuring the strength (pressure) of touches, and/or a digitizer for detecting a magnetic field-type stylus pen.

According to various embodiments of the disclosure, the first area 201 and the second area 202 may be overall symmetrical in shape with respect to the folding area 203. However, unlike the first area 201, the second area 202 may include a notch depending on the presence of the sensor area 324, but the rest may be symmetrical in shape with the first area 201. In other words, the first area 201 and the second area 202 may include symmetrical portions and asymmetrical portions.

Described below are the operation of the first housing structure 310 and the second housing structure 320 and each area of the display 200 depending on the state (e.g., the folded state, unfolded state, or intermediate state) of the electronic device 101.

According to various embodiments of the disclosure, when the electronic device 101 is in the unfolded state (e.g., FIG. 2), the first housing structure 310 and the second housing structure 320 may be disposed to face in the same direction while being angled at 180 degrees therebetween. The surface of the first area 201 and the surface of the second area 202 of the display 200 may be angled at 180 degrees therebetween while facing in the same direction (e.g., forward of the front surface of the electronic device). The folding area 203 may be coplanar with the first area 201 and the second area 202.

According to various embodiments of the disclosure, when the electronic device 101 is in the folded state (e.g., FIG. 3), the first housing structure 310 and the second housing structure 320 may face each other. The surface of the first area 201 and the surface of the second area 202 of the display 200 may be angled at a small angle (e.g., ranging from 0 degrees to 10 degrees) therebetween while facing each other. At least a portion of the folding area 203 may have a curved surface with a predetermined curvature.

According to various embodiments of the disclosure, in the intermediate state of the electronic device 101, the first housing structure 310 and the second housing structure 320 may be arranged at a certain angle therebetween. The surface of the first area 201 of the display 200 and the surface of the second area 202 may form an angle which is larger than the angle in the folded state and smaller than the angle in the unfolded state. The folding area 203 may at least partially have a curved surface with a predetermined curvature and, in this case, the curvature may be smaller than that when it is in the folded state.

According to various embodiments of the disclosure, the electronic device 101 may include an in-folding type or an out-folding type. The in-folding type may mean a state in which the flexible display 200 is not exposed to the outside in the fully folded state. As another example, it may mean a state in which the flexible display 200 is folded in the front direction. The out-folding type may mean a state in which the flexible display 200 is visually exposed to the outside in the fully folded state. As another example, it may mean a state in which the flexible display 200 is folded in the rear direction.

FIG. 4 is an exploded perspective view illustrating a foldable electronic device according to an embodiment of the disclosure.

Referring to FIG. 4, according to various embodiments of the disclosure, a foldable electronic device (hereinafter, the electronic device 101) may include a foldable housing, a flexible display (hereinafter, the display 200), a board unit 520, and a plate 600. The foldable housing may include a first housing structure 310, a second housing structure 320, a first rear cover 380 and a second rear cover 390, a bracket assembly 40, and the hinge structure 510. The first housing structure 310 may include a first housing 312 and a partial area (e.g., a first bracket 40a) of the bracket assembly 40. The second housing structure 320 may include a second housing 322 and a partial area (e.g., the second bracket 40b) of the bracket assembly 40.

According to various embodiments of the disclosure, the display device 200 may include a display panel 200b (e.g., a flexible display panel) and one or more plates or layers (e.g., a supporting plate 240) on which the display panel 200b is seated. According to an embodiment of the disclosure, the supporting plate 240 may be disposed between the display panel 200b and the bracket assembly 40. An adhesive structure (not shown) may be positioned between the supporting plate 240 and the bracket assembly 40, attaching the supporting plate 240 and the bracket assembly 40.

According to various embodiments of the disclosure, the bracket assembly 40 may include a first bracket 40a and a second bracket 40b and the hinge structure 510 may be disposed between the first bracket 40a and the second bracket 40b. The hinge structure 510 may include the hinge case 330 to cover the hinges disposed therein. As another example, a printed circuit board (e.g., a flexible printed circuit board (FPCB)) may be disposed to cross the first bracket 40a and the second bracket 40b.

According to various embodiments of the disclosure, the board unit 520 may include a first main circuit board 521 disposed on a side of the first bracket 40a and a second main circuit board 522 disposed on a side of the second bracket 40b. The first main circuit board 521 and the second main circuit board 522 may be disposed in a space formed by the bracket assembly 40, the first housing structure 310, the second housing structure 320, the first rear cover 380, and the second rear cover 390. Components for implementing various functions of the electronic device 101 may be disposed on the first main circuit board 521 and the second main circuit board 522.

According to various embodiments of the disclosure, the first housing 312 and the second housing 322 may be assembled together to be coupled to two opposite sides of the bracket assembly 40, with the display 200 coupled to the bracket assembly 40. For example, the first housing 312 may be coupled by sliding from one side of the first bracket 40a and the second housing 322 may be coupled by sliding from one side of the second bracket 40b.

According to various embodiments of the disclosure, the plate 600 may be disposed on the rear surface of the display 200. The plate 600 may be disposed on the rear surface of the display 200, and the rigidity of the display 200 may be enhanced. According to an embodiment of the disclosure, the plate 600 may be formed of a metal. A detailed description of the plate 600 is given below along with the description of FIGS. 5A and 5B.

According to an embodiment of the disclosure, the first housing structure 310 may include a first rotation supporting surface 311 disposed on one end of the first housing 312, and the second housing structure 320 may include a second rotation supporting surface 321, corresponding to the first rotation supporting surface 313, disposed on one end of the second housing 322. The first rotation supporting surface 311 and the second rotation supporting surface 321 may include a curved surface corresponding to a curved surface included in the hinge case 330.

According to an embodiment of the disclosure, the first rotation supporting surface 311 and the second rotation supporting surface 321, in the unfolded state of the electronic device 101 (e.g., the electronic device of FIG. 2), may cover the hinge case 330, allowing the hinge case 330 to be not or minimally exposed through the rear surface of the electronic device 101. As another example, the first rotation supporting surface 311 and the second rotation supporting surface 321, in the folded state of the electronic device 101 (e.g., the electronic device of FIG. 3), may rotate along the curved surface included in the hinge case 330, allowing the hinge case 330 to be maximally exposed through the rear surface of the electronic device 101.

Figure 5A:
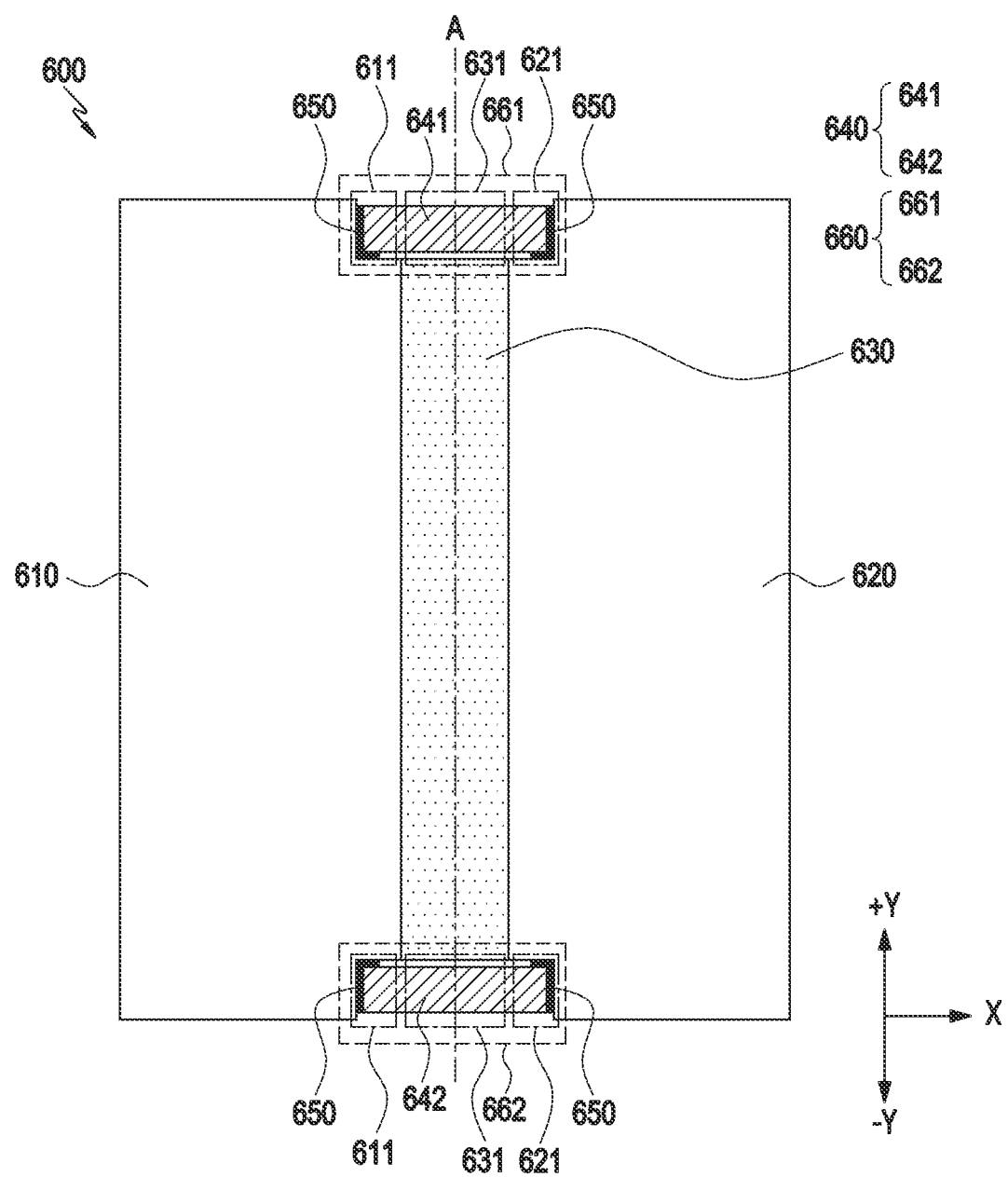
FIG. 5A is a plan view illustrating an embodiment of a plate of a foldable electronic device according to an embodiment of the disclosure.

FIG. 5A is a plan view illustrating an embodiment of a plate of a foldable electronic device according to an embodiment of the disclosure.

Figure 5B:
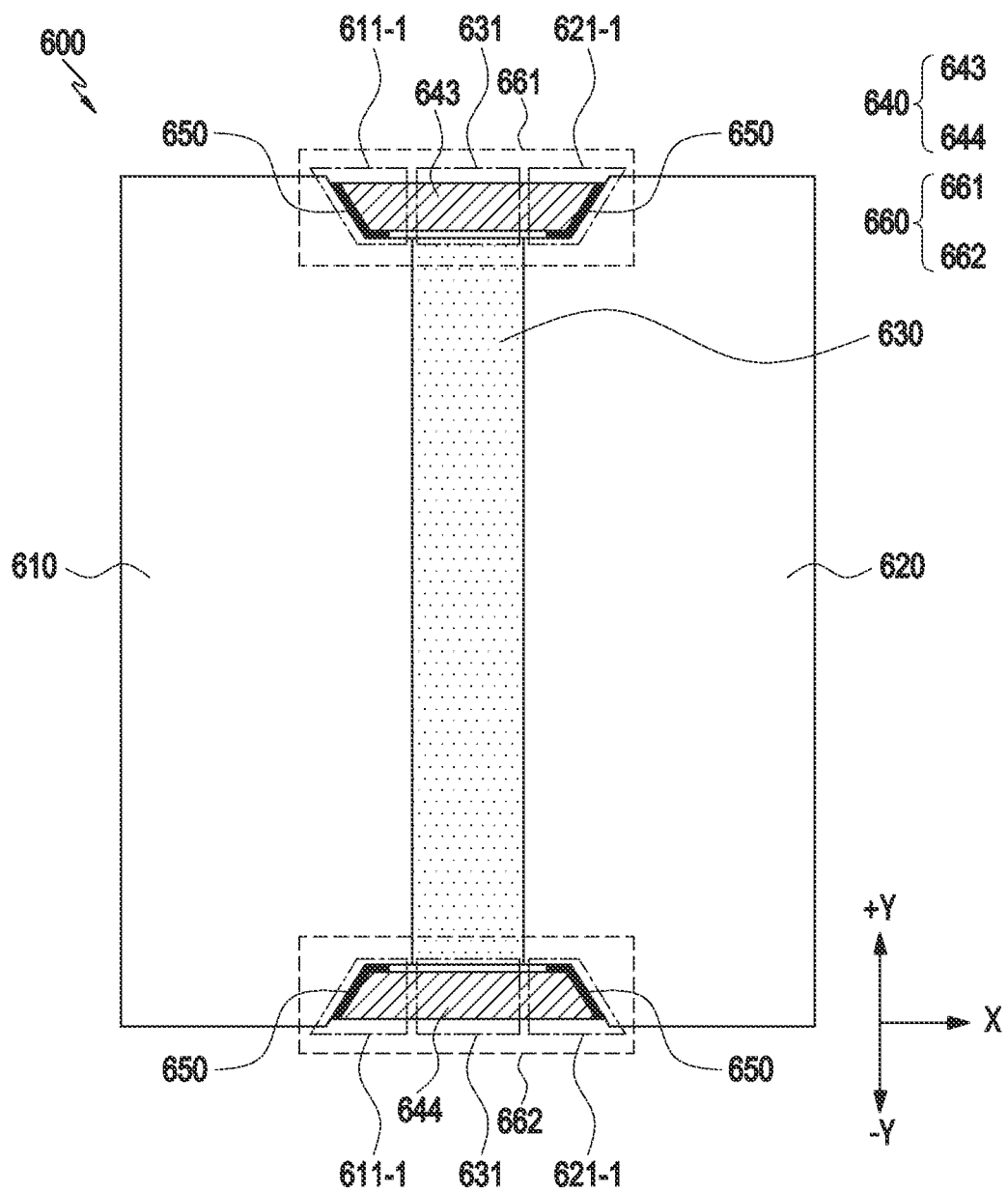
FIG. 5B is a plan view illustrating an embodiment of a plate of a foldable electronic device according to an embodiment of the disclosure.

FIG. 5B is a plan view illustrating an embodiment of a plate of a foldable electronic device according to an embodiment of the disclosure.

The plate 600 disclosed in FIGS. 5A and 5B may be the same as or similar to the plate 600 disclosed in FIG. 4. Accordingly, no description is given of the same components.

According to various embodiments of the disclosure, the plate 600 including a first plate 610, a second plate 620, and a third plate 630 may be formed through a process of processing a rectangular plate-shaped material. According to an embodiment of the disclosure, a first recessed portion 611 of the first plate 610, a second recessed portion 621 of the second plate 620, and a third recessed portion 631 of the third plate 630 may be formed through the process of partially removing two opposite ends of the widthwise direction (X-axis direction) central portion of the rectangular plate-shaped material in the length direction (Y-axis direction). The first recessed portion 611, the second recessed portion 621, and the third recessed portion 631 may be included in a waterproofing area 660.

According to an embodiment of the disclosure, the third plate 630 may be processed to have a lattice pattern through the process of processing a portion of the third plate 630 disposed on the widthwise central portion of the plate 600. The process of forming the first recessed portion 611 to the third recessed portion 631 and the process of forming the third plate 630 may be changed in order.

According to various embodiments of the disclosure, the plate 600 may include the first plate 610, the second plate 620, and the third plate 630. The third plate 630 may be disposed between the first plate 610 and the second plate 620.

According to various embodiments of the disclosure, the first plate 610 and the second plate 620 may be formed in a rectangular plate shape having a length direction (Y-axis direction) and a width direction (X-axis direction). The first plate 610 and the second plate 620 may be formed of metal. As the first plate 610 and the second plate 620 are formed of metal, the rigidity of the display 200 disposed on the front surface of the plate 600 may be enhanced. The first plate 610 and the second plate 620 may be disposed on the left and right of the folding axis A. According to an embodiment of the disclosure, the first plate 610 and the second plate 620 may be formed to be substantially left-right symmetrical with respect to the folding axis A.

According to various embodiments of the disclosure, the third plate 630 may be disposed between the first plate 610 and the second plate 620. The third plate 630 may be formed of metal. The folding axis A may be positioned inside the third plate 630. As the folding axis A is positioned inside the third plate 630, the third plate 630 may be folded. The third plate 630 may be formed in a lattice pattern. As the third plate 630 is formed in a lattice pattern, even when the plate 600 is folded about the folding axis A, no significant stress may occur to the third plate 630, and the folding characteristics of the third plate 630 may be enhanced.

According to various embodiments of the disclosure, the length (Y-axis direction) of the third plate 630 may be shorter than the length (Y-axis direction) of the first and second plates 610 and 620. According to an embodiment of the disclosure, the center of the third plate 630, the center of the first plate 610, and the center 620 of the second plate 620 may be disposed on the same line parallel to the X-axis. Accordingly, as the length of the third plate 630 is shorter than the length of the first plate 610 and the second plate 620, the waterproofing area 660 where the waterproofing member 640 may be disposed may be formed in two opposite ends of the third plate 630. According to an embodiment of the disclosure, the waterproofing area 660 may be disposed in two opposite ends of the widthwise (X-axis direction) central portion in the length direction (Y-axis direction) of the plate 600. According to an embodiment of the disclosure, the area positioned in the upper end (+Y-axis direction) of the plate 600, of the waterproofing area 660 may be defined as a first waterproofing area 661, and the area positioned in the lower end (−Y-axis direction) of the plate 600 may be defined as a second waterproofing area 662.

According to various embodiments of the disclosure, the first recessed portion 611 and the second recessed portion 612 may have a rectangular shape. As described above, the first recessed portion 611 and the second recessed portion 612 may be formed by removing portions of the first plate 610 and the second plate 620.

According to various embodiments of the disclosure, a waterproofing member 640 may be disposed in the waterproofing area 660.

Referring to FIGS. 5A and 5B, the waterproofing member 640 may include a first waterproofing member 641, a second waterproofing member 642, a third waterproofing member 643, and a fourth waterproofing member 644.

Referring to FIG. 5A, according to various embodiments of the disclosure, the planar shape of the first waterproofing member 641 and the second waterproofing member 642 may be formed as a rectangular shape. Referring to FIG. 5B, according to various embodiments of the disclosure, the planar shape of the third waterproofing member 643 and the fourth waterproofing member 644 may be formed in a trapezoidal shape.

Referring to FIG. 5B, as portions of the first plate 610 and the second plate 620 are removed diagonally, the first recessed portion 611-1 and the second recessed portion 621-1 may be formed in a trapezoidal shape. As the first recessed portion 611-1 and the second recessed portion 621-1 are formed in a trapezoidal shape, the stress generated in the embodiment disclosed in FIG. 5B may be reduced as compared with the stress generated in the embodiment disclosed in FIG. 5A. This is described below with reference to FIGS. 9A and 9B.

According to various embodiments of the disclosure, the waterproofing member 640 may be formed of a pressure sensitive adhesive (PSA) or a waterproofing tape. It is possible to prevent entry into the plate 600 of a foreign object including moisture and dust by disposing the waterproofing member 640. As a foreign object is prevented from entering the plate 600, the waterproofing and dustproofing performance of the electronic device 101 may be enhanced. The waterproofing member 640 may be formed of a hard and/or soft material. The configuration of the waterproofing member 640 is described below with reference to FIG. 6.

According to various embodiments of the disclosure, the cured in place gaskets (CIPG) 650 may be disposed to fill between the waterproofing member 640 and the plate 600. According to an embodiment of the disclosure, the CIPG 650 may be disposed to fill between the waterproofing member 640 and the first and second plates 610 and 620. As the CIPG 650 fills between the waterproofing member 640 and the plate 600, a foreign object may be prevented from entering the plate 600 and the third plate 630. Accordingly, as the CIPG 650 is disposed, the sealability of the plate 600 may be enhanced.

Figure 6:
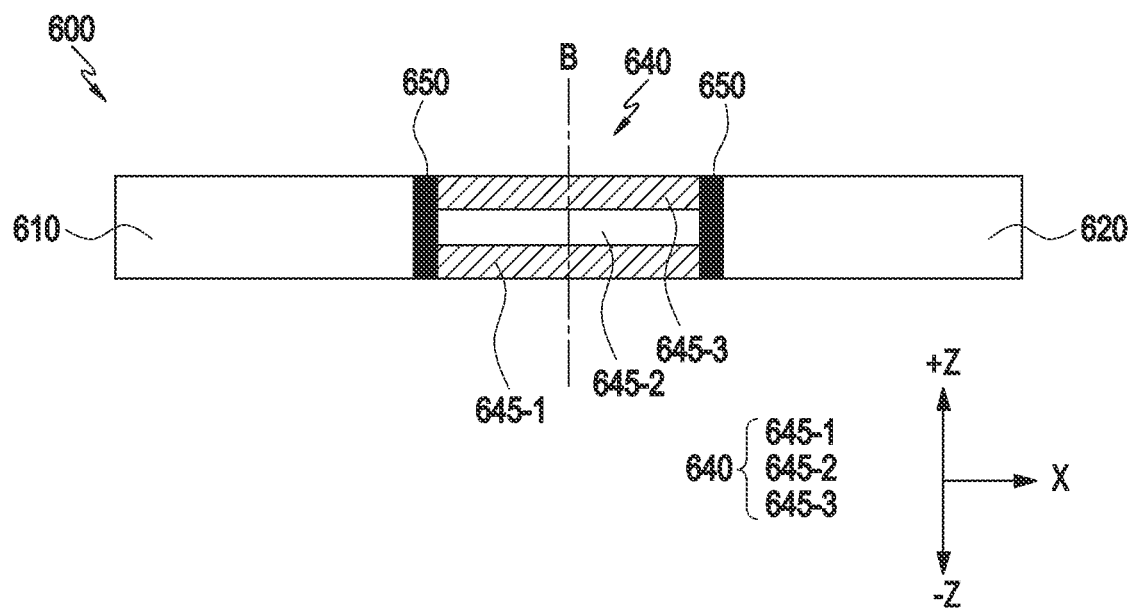
FIG. 6 is a front view illustrating a plate according to an embodiment of the disclosure.

FIG. 6 is a front view illustrating a plate according to an embodiment of the disclosure.

Referring to FIG. 6, a plate 600, a first plate 610, a second plate 620, a waterproofing member 640, and a CIPG 650 disclosed may be identical or similar to the plate 600, the first plate 610, the second plate 620, the waterproofing member 640, and the CIPG 650 disclosed in FIGS. 4 to 5B. Accordingly, no description is given of the same components.

According to various embodiments of the disclosure, the waterproofing member 640 may be disposed between the first plate 610 and the second plate 620. The CIPG 650 may be disposed between the waterproofing member 640 and the first plate 610 and/or the second plate 620.

According to various embodiments of the disclosure, the waterproofing member 640 may include a first layer waterproofing member 645-1, a second layer waterproofing member 645-2, and a third layer waterproofing member 645-3. According to an embodiment of the disclosure, the waterproofing member 640 may more layers of waterproofing members as well as the three layers. The second layer waterproofing member 645-2 may be disposed on an upper portion (+Z-axis direction) of the first layer waterproofing member 645-1, and the third layer waterproofing member 645-3 may be disposed on an upper portion (+Z-axis direction) of the second layer waterproofing member 645-2. Accordingly, the first layer waterproofing member 645-1, the second layer waterproofing member 645-2, and the third layer waterproofing member 645-3 may be sequentially stacked.

Figure 8:
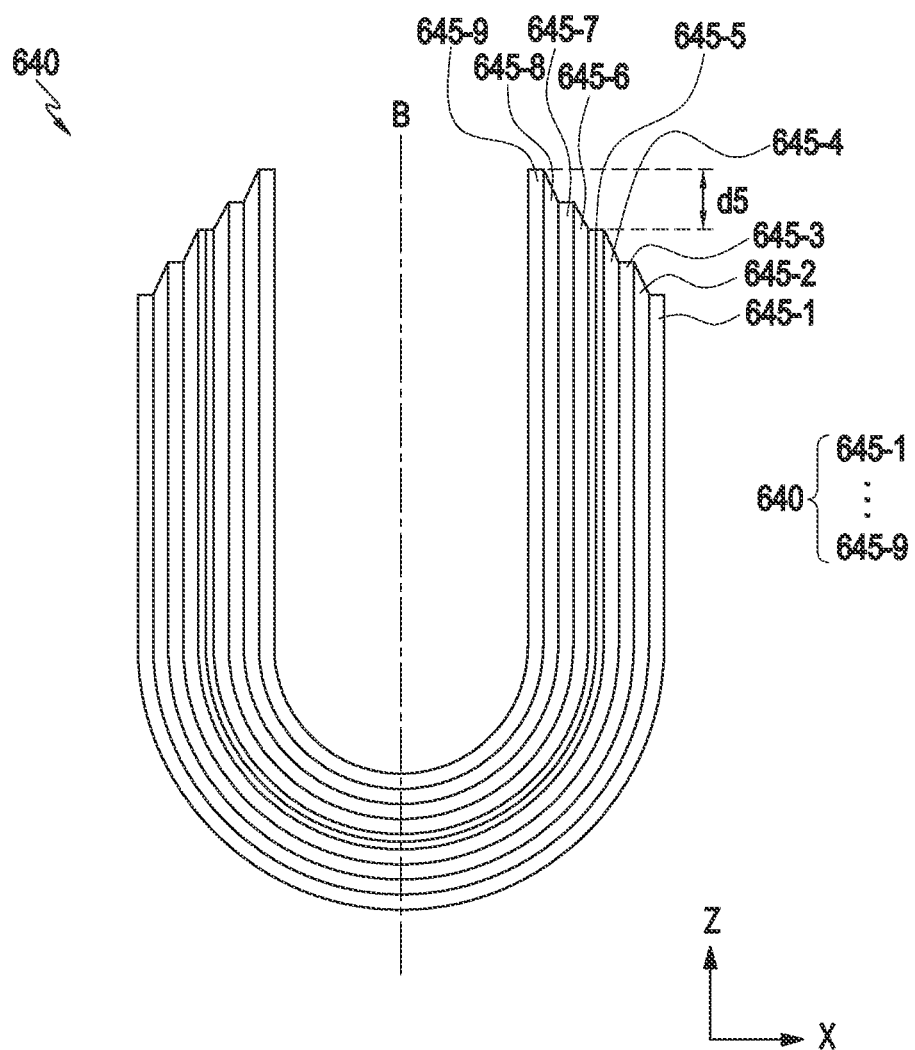
FIG. 8 is a cross-sectional view illustrating a waterproofing member taken along an X-Z plane according to an embodiment of the disclosure.

According to various embodiments of the disclosure, the waterproofing member 640 may be formed of a hard and/or soft PSA (pressure sensitive adhesive). The waterproofing member 640 formed of a hard PSA may be effective in preventing peeling between the third plate 630 and the CIPG 650 and the component. The waterproofing member 640 formed of a soft PSA may be effective in mitigating a slip between the third plate 630 and the CIPG 650 and the component. As the electronic device 101 is folded, a slip may occur in the waterproofing member 640 as shown in FIG. 8, and a description thereof is given below along with the description of FIG. 8.

According to various embodiments of the disclosure, the first layer waterproofing member 645-1 may be including a hard PSA, the second layer waterproofing member 645-2 may be including a soft PSA, and the third layer waterproofing member 645-3 may be including a hard PSA. According to an embodiment of the disclosure, the first layer waterproofing member 645-1 may be including a soft PSA, the second layer waterproofing member 645-2 may be including a hard PSA, and the third layer waterproofing member 645-3 may be including a soft PSA. As such, as the first to third layer waterproofing members 645-1, 645-2, and 645-3 are alternately including a hard PSA and a soft PSA, it is possible to prevent peeling of components including the third plate 630, waterproofing member 640, and CIPG 650 and mitigate a slip between the components when the waterproofing member 640 is folded about the center axis B.

Figure 7:
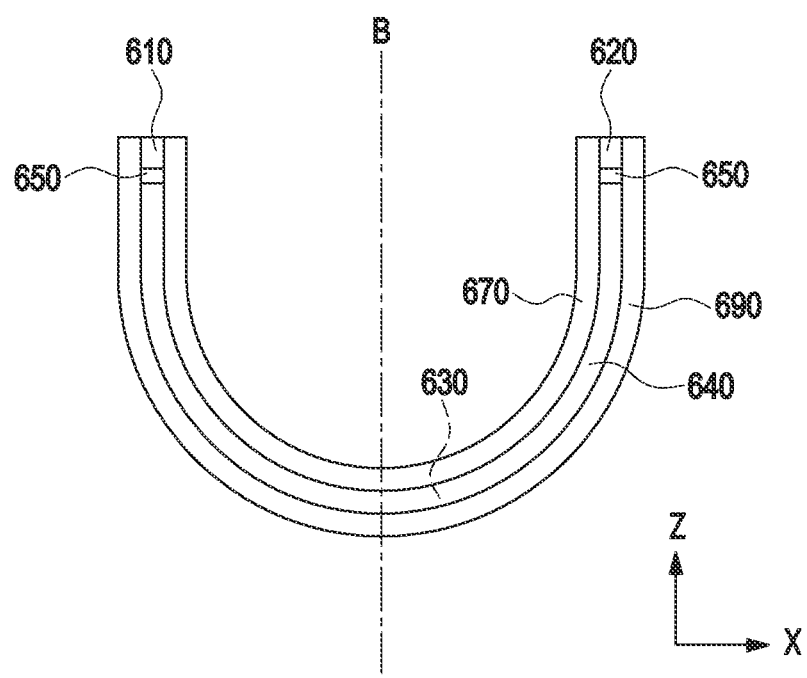
FIG. 7 is a cross-sectional view illustrating a plate taken along an X-Z plane according to an embodiment of the disclosure.

FIG. 7 is a cross-sectional view illustrating a plate taken along an X-Z plane according to an embodiment of the disclosure.

The first plate 610, the second plate 620, the third plate 630, the waterproofing member 640, and the CIPG 650 disclosed in FIG. 7 may be identical or similar to the first plate 610, the second plate 620, the third plate 630, the waterproofing member 640, and the CIPG 650 disclosed in FIGS. 5A to 6. Accordingly, no description is given of the same components.

Referring to FIG. 7, it illustrates a waterproofing member 640 folded about a center axis B according to various embodiments of the disclosure.

According to various embodiments of the disclosure, the plate 600 may be folded about the center axis B. As the plate 600 is folded, the first plate 610 and the second plate 620 may have a portion and another of a waterproofing structure 670, a portion and another of the waterproofing member 640, and a portion and another of a lower panel 690 face each other.

Although not disclosed in FIG. 7, according to various embodiments of the disclosure, the third plate (e.g., the third plate 630 in FIGS. 5A and 5B) may be disposed in the +Y-axis direction of the waterproofing member 640. A portion and another of the third plate 630 may face each other.

According to various embodiments of the disclosure, as the plate 600 is folded, a slip between the components included in the plate 600 may occur due to a difference between the rotation radius of the inside of the plate 600 and the rotation radius of the outside of the plate 600. A detailed description thereof is given below along with the description for FIG. 8.

FIG. 8 is a cross-sectional view illustrating a waterproofing member taken along an X-Z plane according to an embodiment of the disclosure.

The waterproofing member 640 disclosed in FIG. 8 may be identical or similar to the waterproofing member 640 disclosed in FIGS. 5A to 7. Accordingly, no description is given of the same components.

Referring to FIG. 8, according to various embodiments of the disclosure, the waterproofing member 640 may include a first layer waterproofing member 645-1 to a ninth layer waterproofing member 645-9. According to an embodiment of the disclosure, the first layer waterproofing member 645-1 may be formed of a hard PSA (pressure sensitive adhesive), the second layer waterproofing member 645-2 may be formed of a soft PSA, the third layer waterproofing member 645-3 may be formed of a hard PSA, and this way may be repeated, and the ninth layer waterproofing member 645-9 may be formed of a hard PSA. As such, when the waterproofing member 640 in which the hard and soft PSAs are alternately repeated is disposed, the amount of slip d5 between the waterproofing member (e.g., the fifth layer waterproofing member 645-5) disposed in the center and the outermost waterproofing member (e.g., the first layer waterproofing member 645-1 or the ninth layer waterproofing member 645-9) may be about 150 µm or less.

As such, as the waterproofing member 640 in which the hard PSA and the soft PSA are alternately repeated is disposed, a structural change due to slip may be reduced as compared with a waterproofing member 640 composed only of hard PSAs. Further, as the waterproofing member 640 in which the hard PSA and the soft PSA are alternately repeated is disposed, peeling between the structures may be prevented as compared with a waterproofing member 640 composed only of soft PSAs.

Figure 9A:
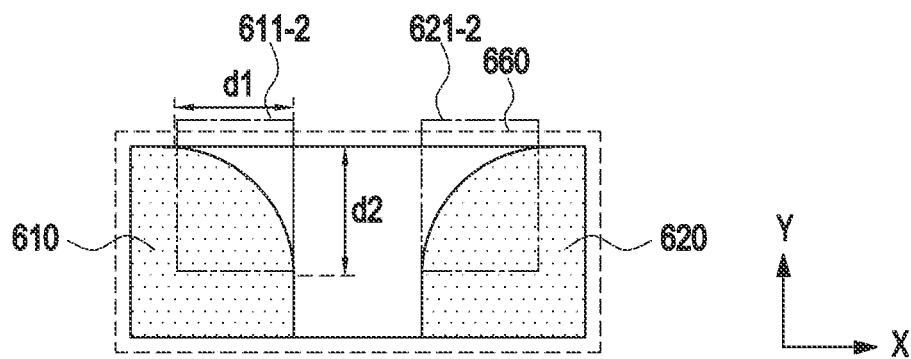
FIG. 9A is a plan view illustrating an embodiment of a plate according to an embodiment of the disclosure.

FIG. 9A is a plan view illustrating an embodiment of a plate according to an embodiment of the disclosure.

Figure 9B:
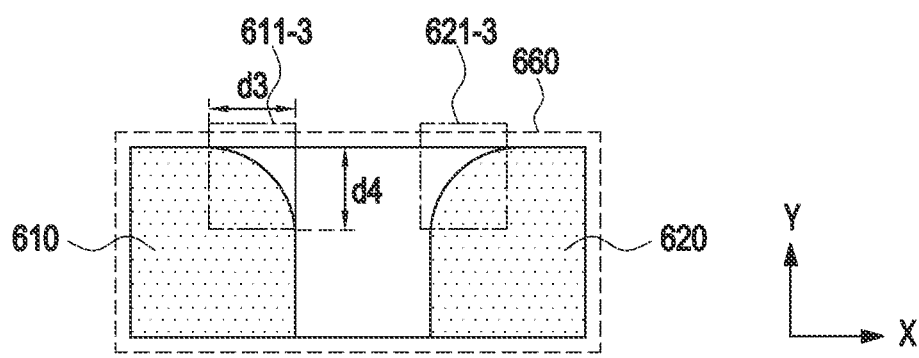
FIG. 9B is a plan view illustrating an embodiment of a plate according to an embodiment of the disclosure.

FIG. 9B is a plan view illustrating an embodiment of a plate according to an embodiment of the disclosure.

The first plate 610, the second plate 620, and the waterproofing area 660 disclosed in FIGS. 9A and 9B may be identical or similar to the first plate 610, the second plate 620, and the waterproofing area 660 disclosed in FIGS. 5A to 7. Accordingly, no description is given of the same components.

According to various embodiments of the disclosure, the first plate 610 and the second plate 620 in the waterproofing area 660 may have various shapes. For example, in FIG. 5A, the first plate 610 and the second plate 620 have rectangular first recessed portions 611 and second recessed portions 621. In FIG. 5B, portions of the first plate 610 and the second plate 620 have trapezoidal first recessed portions 611-1 and second recessed portions 621-1.

Referring to FIGS. 9A and 9B, the first plate 610 and the second plate 620 have curved first recessed portions 611-2 and 611-3 and second recessed portions 621-2 and 621-3. According to another embodiment of the disclosure, the recessed portions (not shown) of the first plate 610 and the second plate 620 may be triangular.

According to various embodiments of the disclosure, an embodiment of the first plate 610 and the second plate 620 in which no recessed portion is formed may be defined as a preserved embodiment.

According to an embodiment of the disclosure, the recessed portions (not shown) of the first plate 610 and the second plate 620 may be shaped as a triangle, and the ratio of the horizontal (X-axis direction) to the vertical (Y-axis direction) of the triangle may be 5:4, and this may be defined as a first removed embodiment.

According to an embodiment of the disclosure, the embodiment disclosed in FIG. 9A may be defined as a second removed embodiment of the disclosure, and the ratio of the horizontal (X-axis direction) length d1 to the vertical (Y-axis direction) length d2 of the first and second recessed portions 611-2 and 621-2 may be about 10:8.

According to an embodiment of the disclosure, the embodiment disclosed in FIG. 9B may be defined as a third removed embodiment of the disclosure, and the ratio of the horizontal (X-axis direction) length d3 to the vertical (Y-axis direction) length d4 of the first and second recessed portions 611-3 and 621-3 may be about 5:4. For example, the horizontal length d1 and the vertical length d2 of the first and second recessed portions 611-2 and 621-2 of the second removed embodiment may be twice the horizontal length d3 and the vertical length d4 of the first and second recessed portions 611-3 and 621-3 of the third removed embodiment.

According to various embodiments of the disclosure, the stress due to bending and stress due to impact may vary depending on the shape of the first plate 610 and the second plate 620 in the waterproofing area 660.

According to various embodiments of the disclosure, the stress due to bending in the preserved embodiment may be about 1361.5 Mpa. The stress due to bending in the first removed embodiment may be about 1139.3 Mpa. The stress due to bending in the second removed embodiment may be about 1137.5 Mpa. The stress due to bending in the third removed embodiment may be about 1134.8 Mpa.

According to various embodiments of the disclosure, the stress due to impact in the preserved embodiment may be about 1231.0 Mpa. The stress due to impact in the first removed embodiment may be about 1106.9 Mpa. The stress due to impact in the second removed embodiment may be about 1110.0 Mpa. The stress due to impact in the third removed embodiment may be about 1218.3 Mpa.

Accordingly, it may be identified that the stress due to bending and stress due to impact vary depending on the shape of the first plate 610 and the second plate 620 in the waterproofing area 660.

According to various embodiments of the disclosure, the first plate 610 and the second plate 620 formed with the first recessed portions 611 and 611-1 and the second recessed portions 621 and 621-1, disclosed in FIGS. 5A and 5B, may have smaller bending-based stress and impact-based stress than in the preserved embodiment.

Figure 10:
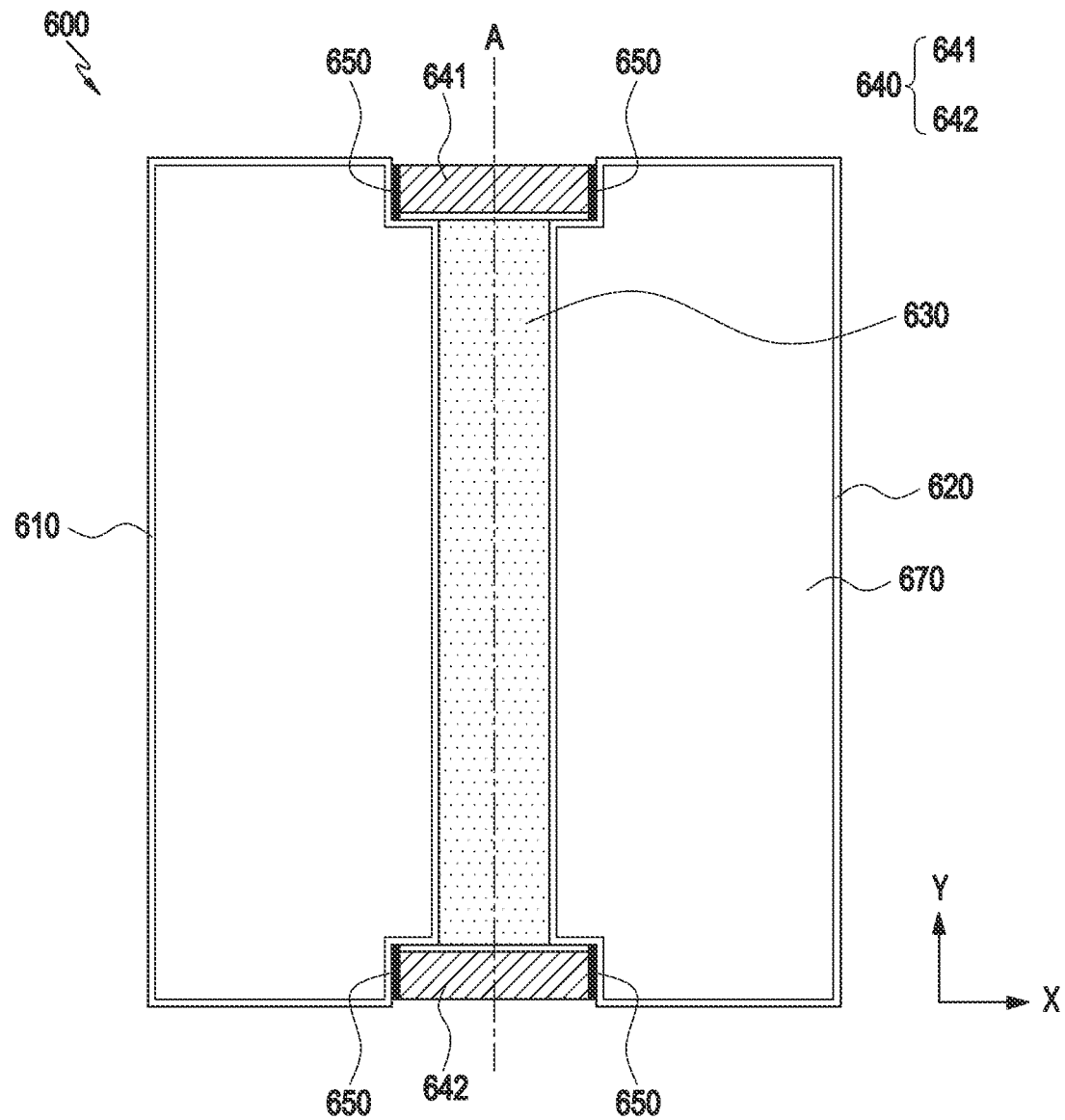
FIG. 10 is a plan view illustrating an embodiment of a plate according to an embodiment of the disclosure.

FIG. 10 is a plan view illustrating an embodiment of a plate according to an embodiment of the disclosure.

Figure 11:
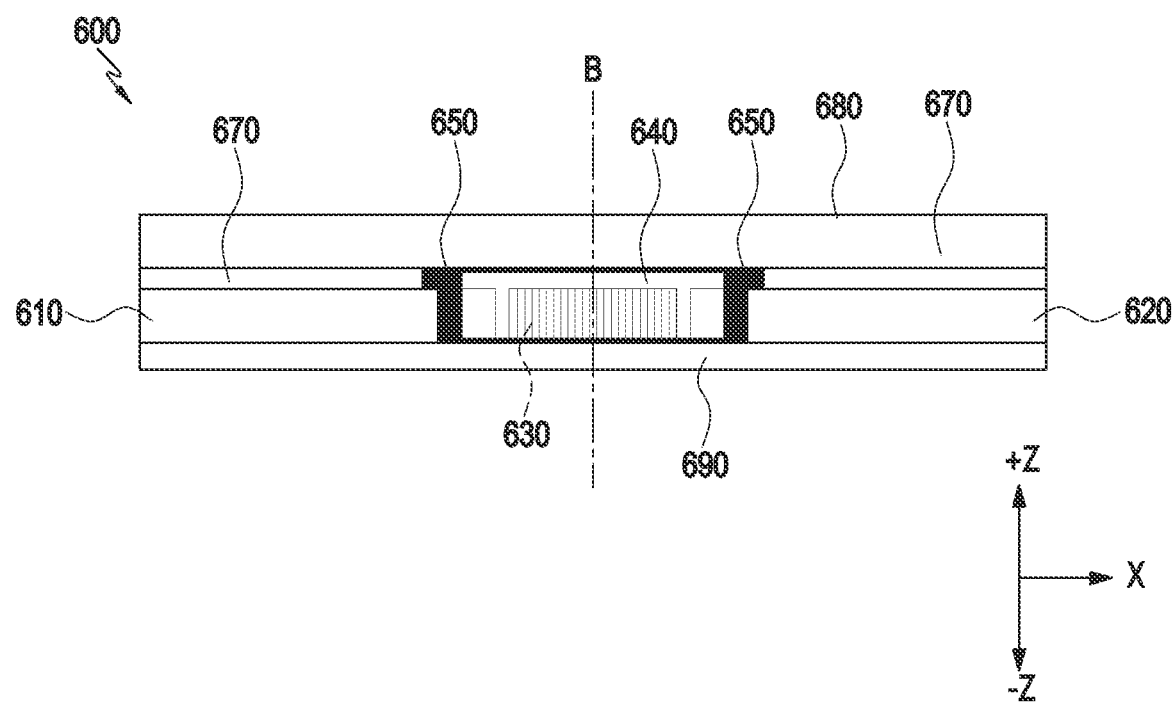
FIG. 11 is a front view illustrating an embodiment of a plate according to an embodiment of the disclosure.

FIG. 11 is a front view illustrating an embodiment of a plate according to an embodiment of the disclosure.

The plate 600, the first plate 610, the second plate 620, the third plate 630, the waterproofing member 640, and the CIPG 650 disclosed in FIGS. 10 and 11 may be identical or similar to the first plate 610, the second plate 620, the third plate 630, the waterproofing member 640, and the CIPG 650 disclosed in FIGS. 5A to 9B. Accordingly, no description is given of the same components.

Referring to FIG. 10, according to various embodiments of the disclosure, the waterproofing structure 670 may be disposed on an upper portion (+Z-axis direction) of the first plate 610 and the second plate 620. The waterproofing structure 670 may be including a PSA (pressure sensitive adhesive). According to an embodiment of the disclosure, the waterproofing structure 670 is not disposed on an upper portion (+Z-axis direction) of the third plate 630 and the waterproofing member 640, but on an upper portion (+Z-axis direction) of the first plate 610 and the second plate 620.

Referring to FIG. 11, according to various embodiments of the disclosure, it may be identified that the waterproofing structure 670 is disposed on an upper portion (+Z-axis direction) of the first plate 610 and the second plate 620 and is disposed to contact the first plate 610, the second plate 620, the CIPG 650, and the upper panel 680.

According to various embodiments of the disclosure, the upper panel 680 may be disposed on an upper portion (+Z-axis direction) of the third plate 630, the waterproofing member 640, the CIPG 650, and the waterproofing structure 670. According to an embodiment of the disclosure, the upper panel 680 may be formed of polyimide (PI) or polyethylene terephthalate (PET). As such, as the upper panel 680 is disposed on an upper portion (+Z-axis direction) of the first plate 610 and the second plate 620, the sealability of the plate 600 may be enhanced.

According to various embodiments of the disclosure, the lower panel 690 may be disposed under (−Z-axis direction) the first plate 610, the second plate 620, the third plate 630, and the CIPG 650, According to an embodiment of the disclosure, the lower panel 690 may be formed of thermo plastic polyurethane (TPU). As such, as the lower panel 690 is disposed under (−Z-axis direction) of the first plate 610 and the second plate 620, the sealability of the plate 600 may be enhanced. According to an embodiment of the disclosure, although not shown in FIG. 11, the thickness (Z-axis direction) of a partial area of the lower panel 690 corresponding to the lower area of the third plate 630 may be formed to be smaller than the thickness (Z-axis direction) of another area (e.g., the lower portion of the first plate 610 and/or the second plate 620). As such, as the thickness of a partial area of the lower panel 690 is formed to be smaller than the thickness of another area, the folding characteristics of the plate 600 may be enhanced.

According to various embodiments of the disclosure, an adhesive (not shown) may be disposed on the outer surface of the waterproofing member 640. As the adhesive is disposed on the outer surface of the waterproofing member 640, the sealability of the plate 600 may be enhanced.

Figure 12:
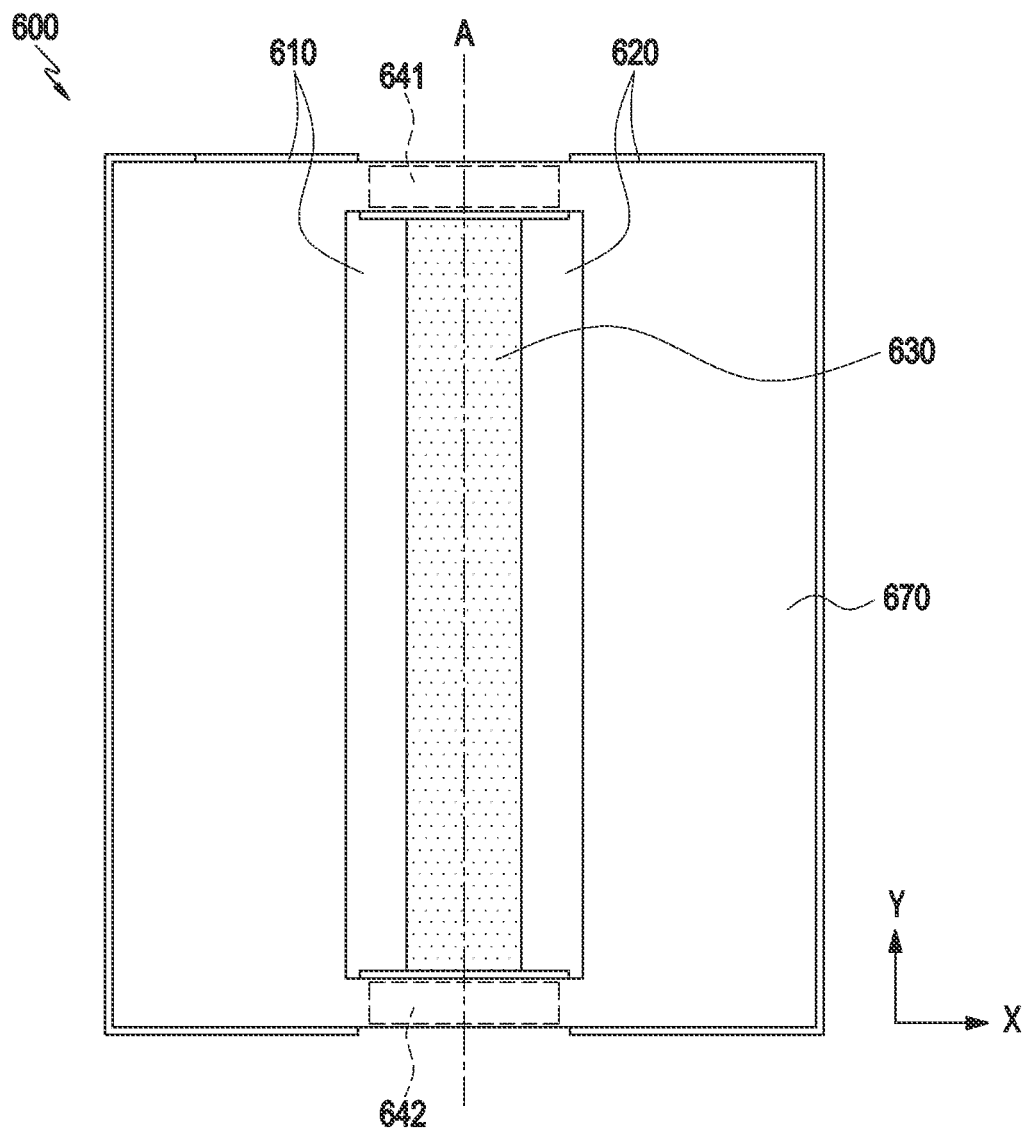
FIG. 12 is a plan view illustrating an embodiment of a plate according to an embodiment of the disclosure.

FIG. 12 is a plan view illustrating an embodiment of a plate according to an embodiment of the disclosure.

Figure 13:
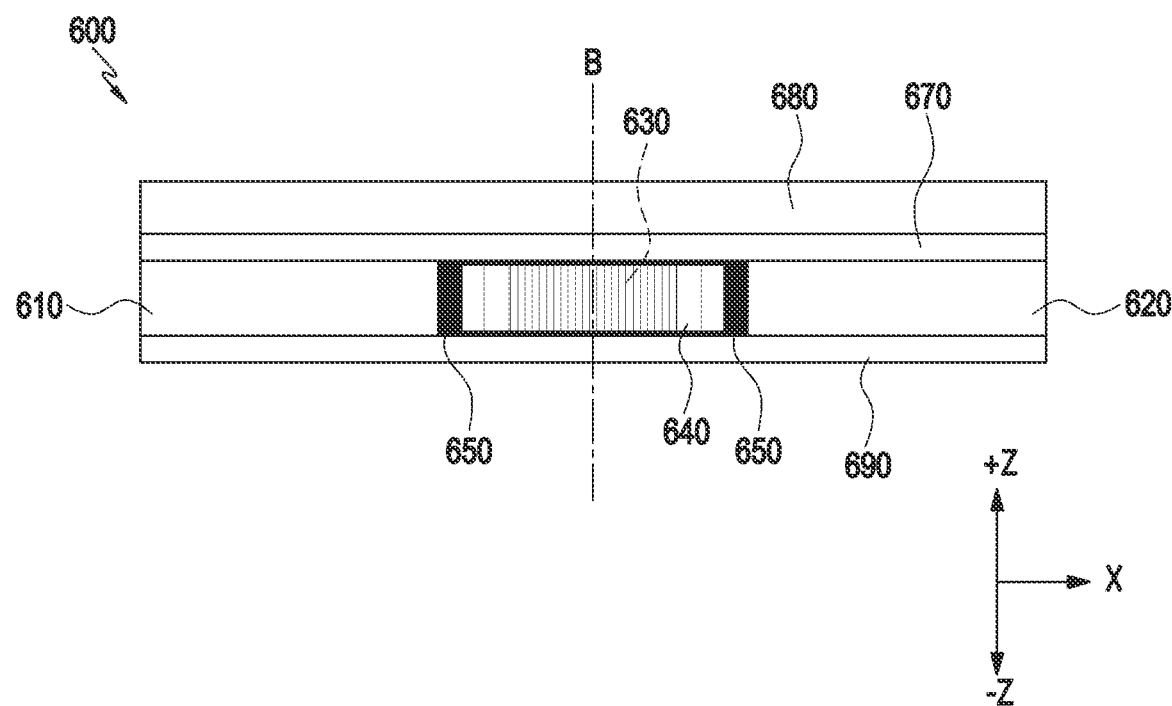
FIG. 13 is a front view illustrating an embodiment of a plate according to an embodiment of the disclosure.

FIG. 13 is a front view illustrating an embodiment of a plate according to an embodiment of the disclosure.

The plate 600, the first plate 610, the second plate 620, the third plate 630, the waterproofing member 640, the CIPG 650, the waterproofing structure 670, the upper panel 680, and the lower panel 690 disclosed in FIGS. 12 and 13 may be identical or similar to the first plate 610, the second plate 620, the third plate 630, the waterproofing member 640, the CIPG 650, the waterproofing structure 670, the upper panel 680, and the lower panel 690 disclosed in FIGS. 5A to 11. Accordingly, no description is given of the same components.

Referring to FIG. 12, according to various embodiments of the disclosure, the waterproofing structure 670 may be disposed on an upper portion (+Z-axis direction) of the first plate 610, the second plate 620, and the waterproofing member 640. The waterproofing structure 670 may be including a PSA (pressure sensitive adhesive). According to an embodiment of the disclosure, the waterproofing structure 670 is not disposed on an upper portion (+Z-axis direction) of the third plate 630, but on an upper portion (+Z-axis direction) of the first plate 610, the second plate 620, and the waterproofing member 640.

Referring to FIG. 13, according to various embodiments of the disclosure, it may be identified that the waterproofing structure 670 is disposed on an upper portion (+Z-axis direction) of the first plate 610, the second plate 620, and the waterproofing member 640 and is disposed to contact the first plate 610, the second plate 620, the waterproofing member 640, the CIPG 650, and the upper panel 680.

According to various embodiments of the disclosure, the upper panel 680 may be disposed on an upper portion (+Z-axis direction) of the third plate 630, the waterproofing member 640, the CIPG 650, and the waterproofing structure 670. According to an embodiment of the disclosure, the upper panel 680 may be formed of polyimide (PI) or polyethylene terephthalate (PET). As such, as the upper panel 680 is disposed on an upper portion (+Z-axis direction) of the first plate 610 and the second plate 620, the sealability of the plate 600 may be enhanced.

According to various embodiments of the disclosure, the lower panel 690 may be disposed under (−Z-axis direction) the first plate 610, the second plate 620, the third plate 630, and the CIPG 650, According to an embodiment of the disclosure, the lower panel 690 may be formed of thermo plastic polyurethane (TPU). As such, as the lower panel 690 is disposed under (−Z-axis direction) of the first plate 610 and the second plate 620, the sealability of the plate 600 may be enhanced. According to an embodiment of the disclosure, although not shown in FIG. 11, the thickness (Z-axis direction) of a partial area of the lower panel 690 corresponding to the lower area of the third plate 630 may be formed to be smaller than the thickness (Z-axis direction) of another area (e.g., the lower portion of the first plate 610 and/or the second plate 620). As such, as the thickness of a partial area of the lower panel 690 is formed to be smaller than the thickness of another area, the folding characteristics of the plate 600 may be enhanced.

According to various embodiments of the disclosure, an adhesive (not shown) may be disposed on the outer surface of the waterproofing member 640. As the adhesive is disposed on the outer surface of the waterproofing member 640, the sealability of the plate 600 may be enhanced.

Figure 14:
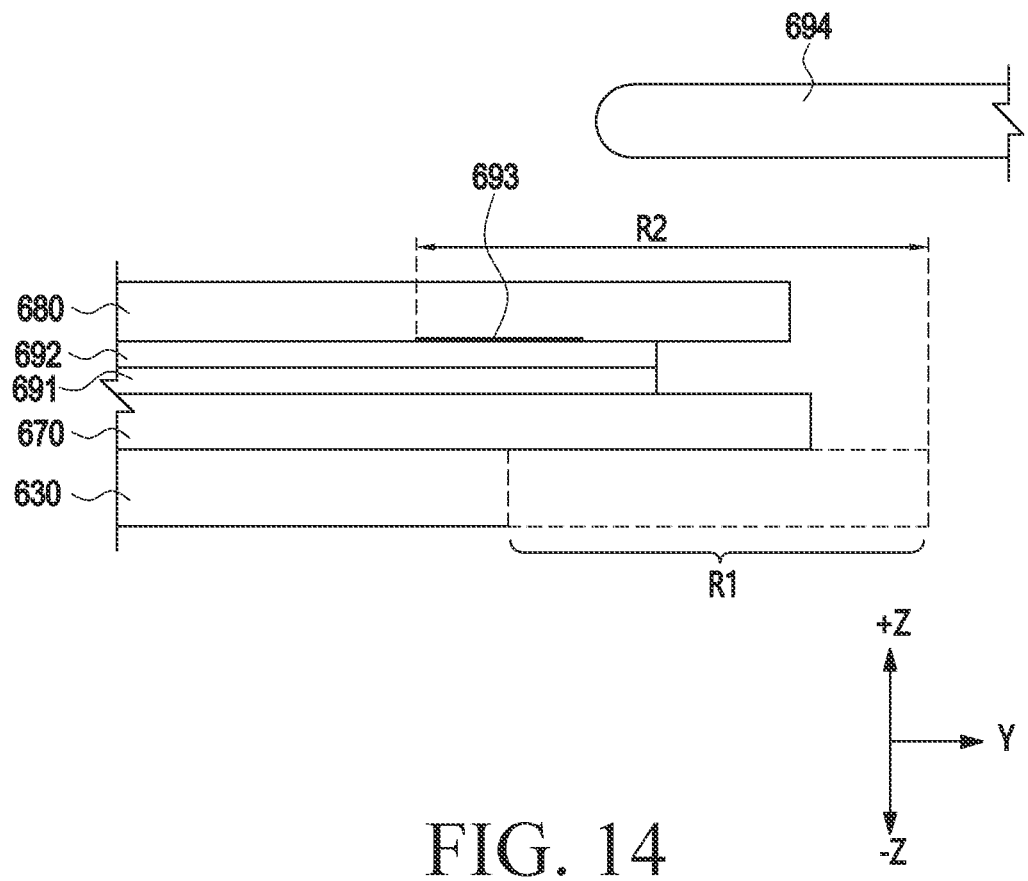
FIG. 14 is a cross-sectional view illustrating a portion of an electronic device taken along a Y-Z plane according to an embodiment of the disclosure.

FIG. 14 is a cross-sectional view illustrating a portion of an electronic device taken along a Y-Z plane according to an embodiment of the disclosure.

The third plate 630, the waterproofing structure 670, and the upper panel 680 disclosed in FIG. 14 may be identical or similar to the third plate 630, the waterproofing structure 670, and the upper panel 680 disclosed in FIGS. 5A to 13. Accordingly, no description is given of the same components.

According to various embodiments of the disclosure, the waterproofing structure 670, an adhesive member 691, the ultra thin glass (UTG) 692, and the upper panel 680 may be sequentially disposed on an upper portion (+Z-axis direction) of the third plate 630. A printed material 693 may be disposed between the upper panel 680 and the UTG 692.

According to various embodiments of the disclosure, the waterproofing structure 670 may be disposed on an upper portion (+Z-axis direction) of the third plate 630. The length (Y-axis direction) of the waterproofing structure 670 may be formed to be larger than the length of the third plate 630. The removed area R1 positioned at one end (+Y-axis direction) of the third plate 630 may be an area where a portion of the third plate 630 has been removed. The length (Y-axis direction) of the removed area R1 may be about 1 mm A configuration including a waterproofing member (e.g., the waterproofing member 640 of FIG. 13), a CIPG (e.g., the CIPG 650 of FIG. 13) and an adhesive (not shown) may be disposed in the removed area R1.

According to various embodiments of the disclosure, the adhesive member 691 may be disposed on an upper portion (+Z-axis direction) of the waterproofing structure 670. The length (Y-axis direction) of the adhesive member 691 may be formed to be smaller than the length (Y-axis direction) of the waterproofing structure 670.

According to various embodiments of the disclosure, the UTG 692 may be disposed on an upper portion (+Z-axis direction) of the adhesive member 691. The length (Y-axis direction) of the UTG 692 may correspond to the length (Y-axis direction) of the adhesive member 691.

According to various embodiments of the disclosure, the upper panel 680 may be disposed on the upper portion of the UTG 692 (in the Z-axis direction). The length (Y-axis direction) of the upper panel 680 may be formed to be larger than the length (Y-axis direction) of the UTG 692.

According to various embodiments of the disclosure, a printed material 693 may be disposed between the upper panel 680 and the UTG 692. An area from one end −Y-axis direction) of the printed material 693 to one end (+Y-axis direction) of the removed area R1 of the third plate 630 may be defined as an invisible area R2. The length (Y-axis direction) of the invisible area R2 may be about 1.277 mm. As the printed material 693 is disposed between the upper panel 680 and the UTG 692, the lower portion (−Z-axis direction) of the printed material 693 may be invisible to the user. Accordingly, as the printed material 693 is disposed, the removed area R1 may be invisible to the user.

According to various embodiments of the disclosure, a front structure 694 disposed apart from the upper panel 680 may be disposed on the upper portion (+Z-axis direction) of the upper panel 680. One end −Y-axis direction) of the front structure 694 may be disposed to correspond to the other end (+Y-axis direction) of the printed material 693. According to an embodiment of the disclosure, one end −Y-axis direction) of the front structure 694 may be disposed to be smaller in Y-axis value than the other end (+Y-axis direction) of the printed material 693. Accordingly, the removed area R1 may be invisible to the user.

Figure 15A:
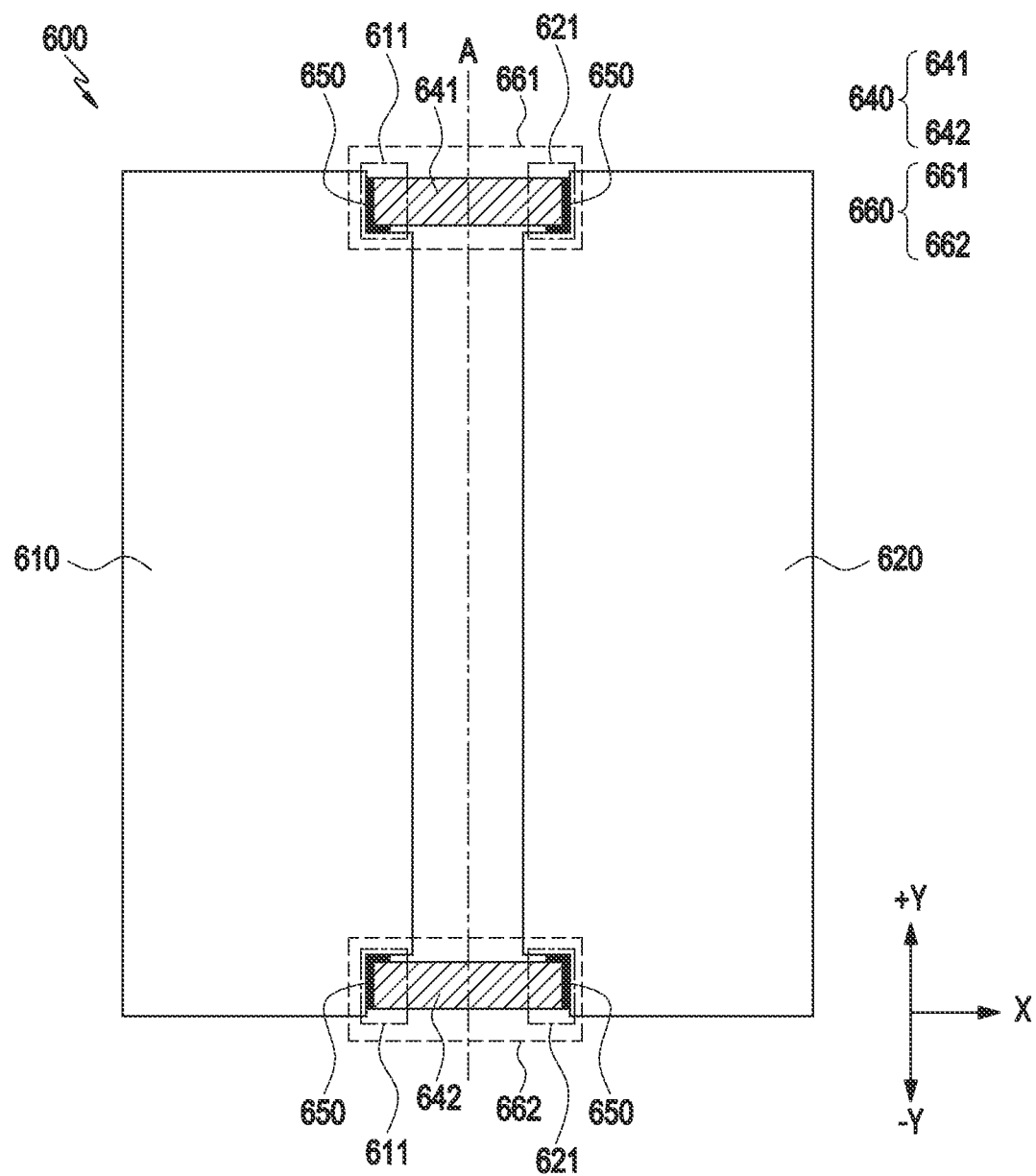
FIG. 15A is a plan view illustrating an embodiment of a plate according to an embodiment of the disclosure.

FIG. 15A is a plan view illustrating an embodiment of a plate according to an embodiment of the disclosure.

Figure 15B:
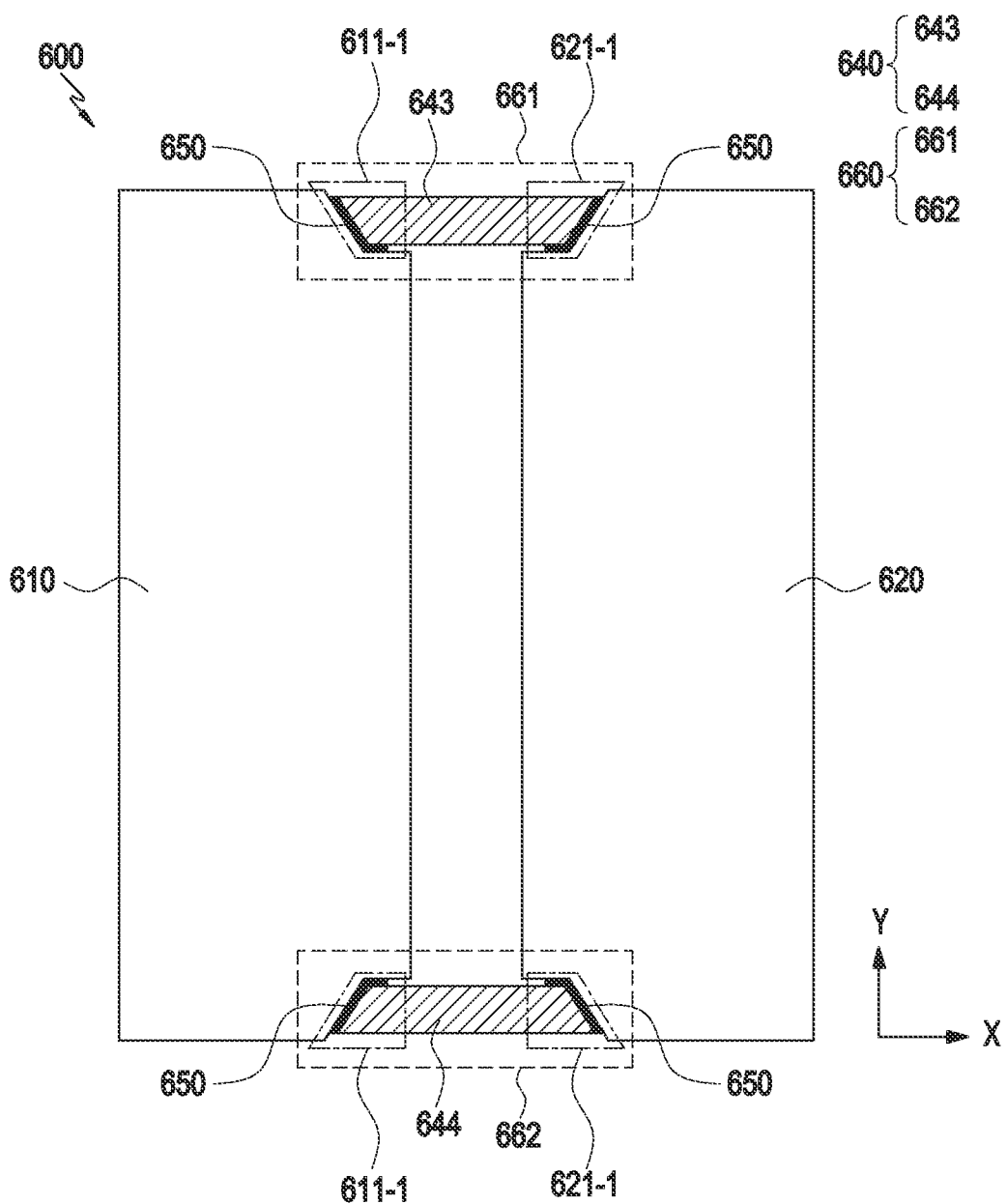
FIG. 15B is a plan view illustrating an embodiment of a plate according to an embodiment of the disclosure.

FIG. 15B is a plan view illustrating an embodiment of a plate according to an embodiment of the disclosure.

The plate 600, the first plate 610, the second plate 620, the waterproofing member 640, the CIPG 650, and the waterproofing area 660 disclosed in FIGS. 15A and 15B may be identical or similar to the plate 600, the first plate 610, the second plate 620, the waterproofing member 640, the CIPG 650, and the waterproofing area 660 disclosed in FIGS. 5A to 14. Accordingly, no description is given of the same components.

According to various embodiments of the disclosure, the plate 600 including a first plate 610 and a second plate 620 may be formed through a process of processing a rectangular plate-shaped material.

According to various embodiments of the disclosure, the plate 600 may include a first plate 610 and a second plate 620. The first plate 610 and the second plate 620 may be disposed to be spaced apart from each other in one direction (X-axis direction).

According to various embodiments of the disclosure, the first plate 610 and the second plate 620 may be formed in a rectangular plate shape having a length direction (Y-axis direction) and a width direction (X-axis direction). The first plate 610 and the second plate 620 may be formed of metal. As the first plate 610 and the second plate 620 are formed of metal, the rigidity of the display 200 disposed on the front surface of the plate 600 may be enhanced. The first plate 610 and the second plate 620 may be disposed on the left and right of the folding axis A. According to an embodiment of the disclosure, the first plate 610 and the second plate 620 may be formed to be substantially left-right symmetrical with respect to the folding axis A.

According to various embodiments of the disclosure, a waterproofing area 660 may be formed at two opposite ends (Y-axis direction) in the length direction of the gapped space between the first plate 610 and the second plate 620. According to an embodiment of the disclosure, the waterproofing area 660 may be disposed in two opposite ends of the widthwise (X-axis direction) central portion in the length direction (Y-axis direction) of the plate 600. The area positioned in the upper end (+Y-axis direction) of the plate 600, of the waterproofing area 660 may be defined as a first waterproofing area 661, and the area positioned in the lower end −Y-axis direction) of the plate 600 may be defined as a second waterproofing area 662.

According to various embodiments of the disclosure, the first recessed portion 611 and the second recessed portion 612 may have a rectangular shape. As described above, the first recessed portion 611 and the second recessed portion 612 may be formed by removing portions of the first plate 610 and the second plate 620.

According to various embodiments of the disclosure, a waterproofing member 640 may be disposed in the waterproofing area 660. Referring to FIGS. 15A and 15B, the waterproofing member 640 may include the first waterproofing member 641, the second waterproofing member 642, the third waterproofing member 643, and the fourth waterproofing member 644. Referring to FIG. 15A, according to various embodiments of the disclosure, the planar shape of the first waterproofing member 641 and the second waterproofing member 642 may be formed as a rectangular shape. Referring to FIG. 15B, according to various embodiments of the disclosure, the planar shape of the third waterproofing member 643 and the fourth waterproofing member 644 may be formed in a trapezoidal shape.

According to various embodiments of the disclosure, a waterproofing member 640 may be disposed in the waterproofing area 660. Referring to FIGS. 15A and 15B, the waterproofing member 640 may include the first waterproofing member 641, the second waterproofing member 642, the third waterproofing member 643, and the fourth waterproofing member 644.

Referring to FIG. 15A, according to various embodiments of the disclosure, the planar shape of the first waterproofing member 641 and the second waterproofing member 642 may be formed as a rectangular shape. Referring to FIG. 15B, according to various embodiments of the disclosure, the planar shape of the third waterproofing member 643 and the fourth waterproofing member 644 may be formed in a trapezoidal shape.

Referring to FIG. 15B, as portions of the first plate 610 and the second plate 620 are removed diagonally, the first recessed portion 611-1 and the second recessed portion 621-1 may be formed in a trapezoidal shape. As the first recessed portion 611-1 and the second recessed portion 621-1 are formed in a trapezoidal shape, the stress generated in the embodiment disclosed in FIG. 15B may be reduced as compared with the stress generated in the embodiment disclosed in FIG. 15A. The description for FIGS. 9A and 9B is applied thereto.

According to various embodiments of the disclosure, the waterproofing member 640 may be formed of a pressure sensitive adhesive (PSA) or a waterproofing tape. It is possible to prevent entry into the plate 600 of a foreign object including moisture and dust by disposing the waterproofing member 640. As a foreign object is prevented from entering the plate 600, the waterproofing and dustproofing performance of the electronic device 101 may be enhanced. The waterproofing member 640 may be formed of a hard and/or soft material. The description for FIG. 6 is applied to the configuration of the waterproofing member 640.

According to various embodiments of the disclosure, the CIPG 650 may be disposed to fill between the waterproofing member 640 and the first and second plates 610 and 620. As the CIPG 650 fills between the waterproofing member 640 and the plate 600, a foreign object may be prevented from entering the plate 600. Accordingly, as the CIPG 650 is disposed, the sealability of the plate 600 may be enhanced.

Figure 16:
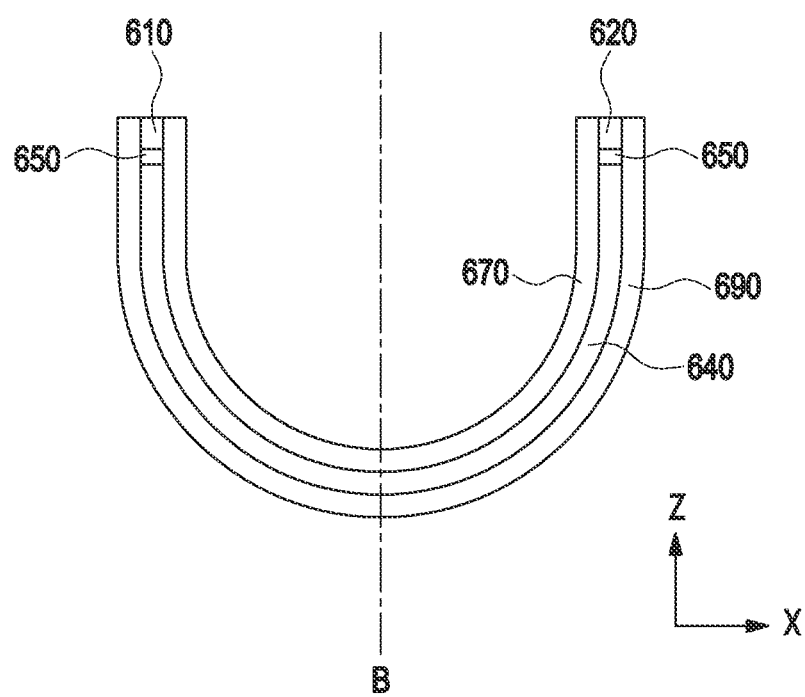
FIG. 16 is a cross-sectional view illustrating a plate taken along an X-Z plane according to an embodiment of the disclosure.

FIG. 16 is a cross-sectional view illustrating a plate taken along an X-Z plane according to an embodiment of the disclosure.

The first plate 610, the second plate 620, the waterproofing member 640, and the CIPG 650 disclosed in FIG. 16 may be identical or similar to the first plate 610, the second plate 620, the waterproofing member 640, and the CIPG 650 disclosed in FIGS. 15A and 15B. Accordingly, no description is given of the same components.

FIG. 16 illustrates a waterproofing member 640 folded about a center axis B according to various embodiments of the disclosure.

According to various embodiments of the disclosure, the plate 600 may be folded about the center axis B. As the plate 600 is folded, the first plate 610 and the second plate 620 may have a portion and another of the waterproofing structure 670, a portion and another of the waterproofing member 640, and a portion and another of the lower panel 690 face each other.

According to various embodiments of the disclosure, as the plate 600 is folded, a slip between the components included in the plate 600 may occur due to a difference between the rotation radius of one side of the plate 600 and the rotation radius of the other side of the plate 600. The description for FIG. 8 is applied thereto.

According to various embodiments of the disclosure, an electronic device (e.g., the electronic device 101 of FIG. 4) may comprise a housing (e.g., the foldable housing 300 of FIG. 4) including a first plate (e.g., the first plate 610 of FIG. 5A), a second plate (e.g., the second plate 620 of FIG. 5A), and a third plate (e.g., the third plate 630 of FIG. 5A) connecting the first plate and the second plate to be pivotable from a folded state of the first plate and the second plate to an unfolded state, a flexible display (e.g., the flexible display 200 of FIG. 3) extending from the first plate across the third plate to the second plate, and at least one waterproofing member (e.g., the waterproofing member 640 of FIG. 5A) disposed on two lengthwise opposite ends of the third plate. The first plate may include at least one first recessed portion (e.g., the first recessed portion 611 of FIG. 5A) recessed inward from at least a portion of an edge of the first plate. The second plate may include at least one second recessed portion (e.g., the second recessed portion 621 of FIG. 5A) recessed inward from at least a portion of an edge of the second plate. At least a portion of the third plate may include a portion formed in a lattice pattern. The third plate is formed to be shorter in length than the first plate and the second plate. The at least one first recessed portion and the at least one second recessed portion may be disposed in two lengthwise opposite ends of the third plate.

According to various embodiments of the disclosure, the at least one first recessed portion and the at least one second recessed portion may have a rectangular shape.

According to various embodiments of the disclosure, the at least one first recessed portion and the at least one second recessed portion may have a trapezoidal shape.

According to various embodiments of the disclosure, the at least one first recessed portion and the at least one second recessed portion may have a curved shape.

According to various embodiments of the disclosure, the electronic device may further comprise a CIPG (e.g., the CIPG 650 of FIG. 5A) disposed adjacent to the at least one waterproofing member.

According to various embodiments of the disclosure, the at least one waterproofing member may include a soft structure and a hard structure alternately stacked.

According to various embodiments of the disclosure, the electronic device may further comprise a waterproofing structure (e.g., the waterproofing structure 670 of FIG. 7) disposed on upper surfaces of the first plate and the second plate.

According to various embodiments of the disclosure, the electronic device may further comprise an upper panel (e.g., the upper panel 680 of FIG. 11) disposed on an upper surface of the waterproofing structure.

According to various embodiments of the disclosure, the electronic device may further comprise an adhesive member (e.g., the adhesive member 691 of FIG. 14) and a UTG (e.g., the UTG 692 of FIG. 14) disposed between the waterproofing structure and the upper panel.

According to various embodiments of the disclosure, the electronic device may further comprise a printed material (e.g., the printed material 693 of FIG. 14) disposed in at least one area between the UTG and the upper panel.

According to various embodiments of the disclosure, an electronic device (e.g., the electronic device 101 of FIG. 4) may comprise a housing including a first plate (e.g., the first plate 610 of FIG. 15A) and a second plate (e.g., the second plate 620 of FIG. 15A) providing a motion relative to the first plate and disposed to be spaced apart from the first plate, a flexible display (e.g., the flexible display 200 of FIG. 3) extending from the first plate to the second plate, and at least one waterproofing member (e.g., the waterproofing member 640 of FIG. 15A) disposed between the first plate and the second plate. The first plate may include at least one first recessed portion (e.g., the first recessed portion 611 of FIG. 15A) recessed inward from at least a portion of an edge of the first plate. The second plate may include at least one second recessed portion (e.g., the second recessed portion 621 of FIG. 15A) recessed inward from at least a portion of an edge of the second plate. The at least one first recessed portion may be formed in two opposite ends of one surface of the first plate facing the second plate. The at least one second recessed portion may be formed in two opposite ends of one surface of the second plate facing the first plate.

According to various embodiments of the disclosure, the at least one first recessed portion and the at least one second recessed portion may have a rectangular shape.

According to various embodiments of the disclosure, the at least one first recessed portion and the at least one second recessed portion may have a trapezoidal shape.

According to various embodiments of the disclosure, the at least one first recessed portion and the at least one second recessed portion may have a curved shape.

According to various embodiments of the disclosure, the electronic device may further comprise a CIPG (e.g., the CIPG 650 of FIG. 15A) disposed adjacent to the at least one waterproofing member.

According to various embodiments of the disclosure, the at least one waterproofing member may include a soft structure and a hard structure alternately stacked.

According to various embodiments of the disclosure, the electronic device may further comprise a waterproofing structure (e.g., the waterproofing structure 670 of FIG. 7) disposed on upper surfaces of the first plate and the second plate.

According to various embodiments of the disclosure, the electronic device may further comprise an upper panel (e.g., the upper panel 680 of FIG. 11) disposed on an upper surface of the waterproofing structure.

According to various embodiments of the disclosure, the electronic device may further comprise an adhesive member (e.g., the adhesive member 691 of FIG. 14) and a UTG (e.g., the UTG 692 of FIG. 14) disposed between the waterproofing structure and the upper panel.

According to various embodiments of the disclosure, the electronic device may further comprise a printed material (e.g., the printed material 693 of FIG. 14) disposed in at least one area between the UTG and the upper panel.

According to various embodiments of the disclosure, the electronic device may further comprise a third plate (e.g., the third plate 630 of FIGS. 5A to 5B) connecting the first plate and the second plate. A third recessed portion (e.g., the third recessed portion 631 of FIGS. 5A to 5B) of the third plate is formed by partially removing two opposite ends of a widthwise direction central portion of a rectangular plate-shaped material in a length direction.

According to various embodiments of the disclosure, a waterproofing area (e.g., the waterproofing area 660 of FIGS. 5A to 5B) where the at least one waterproofing member is disposed is formed in two opposite ends of the third plate. The first recessed portion, the second recessed portion, and the third recessed portion are included in the waterproofing area.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising,
 a housing including a first plate, a second plate, and a third plate connecting the first plate and the second plate to be pivotable from a folded state of the first plate and the second plate to an unfolded state;
 a flexible display extending from the first plate across the third plate to the second plate; and
 at least one waterproofing member disposed on two lengthwise opposite ends of the third plate,
 wherein the first plate includes at least one first recessed portion recessed inward from at least a portion of an edge of the first plate,
 wherein the second plate includes at least one second recessed portion recessed inward from at least a portion of an edge of the second plate,
 wherein at least a portion of the third plate includes a portion formed in a lattice pattern,
 wherein the third plate is formed to be shorter in length than the first plate and the second plate, and
 wherein the at least one first recessed portion and the at least one second recessed portion are disposed in two lengthwise opposite ends of the third plate.

2. The electronic device of claim 1, wherein the at least one first recessed portion and the at least one second recessed portion have a rectangular shape.

3. The electronic device of claim 1, wherein the at least one first recessed portion and the at least one second recessed portion have a trapezoidal shape.

4. The electronic device of claim 1, wherein the at least one first recessed portion and the at least one second recessed portion have a curved shape.

5. The electronic device of claim 1, further comprising a cured in place gasket (CIPG) disposed adjacent to the at least one waterproofing member.

6. The electronic device of claim 1, wherein the at least one waterproofing member includes a soft structure and a hard structure alternately stacked.

7. The electronic device of claim 1, further comprising a waterproofing structure disposed on upper surfaces of the first plate and the second plate.

8. The electronic device of claim 7, further comprising an upper panel disposed on an upper surface of the waterproofing structure.

9. The electronic device of claim 8, further comprising an adhesive member and an ultra thin glass (UTG) disposed between the waterproofing structure and the upper panel.

10. The electronic device of claim 9, further comprising a printed material disposed in at least one area between the UTG and the upper panel.

11. An electronic device comprising,
- a housing including a first plate and a second plate providing a motion relative to the first plate and disposed to be spaced apart from the first plate;
- a flexible display extending from the first plate to the second plate; and
- at least one waterproofing member disposed between the first plate and the second plate,
- wherein the first plate includes at least one first recessed portion recessed inward from at least a portion of an edge of the first plate,
- wherein the second plate includes at least one second recessed portion recessed inward from at least a portion of an edge of the second plate,
- wherein the at least one first recessed portion is formed in two opposite ends of one surface of the first plate facing the second plate, and
- wherein the at least one second recessed portion is formed in two opposite ends of one surface of the second plate facing the first plate.

12. The electronic device of claim 11, wherein the at least one first recessed portion and the at least one second recessed portion have a rectangular shape.

13. The electronic device of claim 11, wherein the at least one first recessed portion and the at least one second recessed portion have a trapezoidal shape.

14. The electronic device of claim 11, wherein the at least one first recessed portion and the at least one second recessed portion have a curved shape.

15. The electronic device of claim 11, further comprising a cured in place gasket (CIPG) disposed adjacent to the at least one waterproofing member.

16. The electronic device of claim 11, wherein the at least one waterproofing member includes a soft structure and a hard structure alternately stacked.

17. The electronic device of claim 11, further comprising a waterproofing structure disposed on upper surfaces of the first plate and the second plate.

18. The electronic device of claim 17, further comprising an upper panel disposed on an upper surface of the waterproofing structure.

19. The electronic device of claim 18, further comprising an adhesive member and an ultra thin glass (UTG) disposed between the waterproofing structure and the upper panel.

20. The electronic device of claim 19, further comprising a printed material disposed in at least one area between the UTG and the upper panel.

* * * * *